US008522887B1

(12) United States Patent
Madison

(10) Patent No.: US 8,522,887 B1
(45) Date of Patent: Sep. 3, 2013

(54) AQUIFIER FLOW CONTROLLING VALVE ASSEMBLY AND METHOD

(76) Inventor: Kent R. Madison, Echo, OR (US)

( * ) Notice: Subject to any disclaimer, the term of this patent is extended or adjusted under 35 U.S.C. 154(b) by 368 days.

(21) Appl. No.: 12/815,324

(22) Filed: Jun. 14, 2010

Related U.S. Application Data

(60) Provisional application No. 61/345,943, filed on May 18, 2010.

(51) Int. Cl.
*E21B 34/14* (2006.01)
*F16K 11/02* (2006.01)

(52) U.S. Cl.
USPC ........ 166/386; 166/319; 166/67; 137/625.49; 137/625.5

(58) Field of Classification Search
USPC .. 166/386, 319, 67; 405/41, 36; 137/625.48, 137/625.49, 625.5
See application file for complete search history.

(56) References Cited

U.S. PATENT DOCUMENTS

| 166,216 | A | * | 8/1875 | Mullowny ................ 137/68.14 |
| 353,548 | A | | 11/1886 | Franklin |
| 922,060 | A | | 5/1909 | Stockdon |
| 966,911 | A | | 8/1910 | Hardsocg |
| 1,285,769 | A | | 11/1918 | Melcher |
| 1,799,373 | A | * | 4/1931 | Humason ................... 166/205 |
| 1,909,179 | A | | 5/1933 | Huffman |
| 1,919,856 | A | * | 7/1933 | McGeorge ............... 137/625.39 |
| 1,919,955 | A | | 7/1933 | Leech et al. |
| 2,091,482 | A | | 6/1934 | McCreary et al. |
| 2,654,395 | A | | 10/1953 | Kaye |
| 2,664,859 | A | | 1/1954 | Green |
| 2,693,203 | A | | 2/1954 | Hempel |
| 2,690,227 | A | * | 9/1954 | Huber ........................ 166/165 |
| 2,842,162 | A | * | 7/1958 | Schwegman ................ 138/43 |
| 3,021,870 | A | * | 2/1962 | Allen ...................... 137/625.12 |
| 3,112,764 | A | | 12/1963 | Anderson et al. |
| 3,120,267 | A | | 2/1964 | Bayless |
| 3,202,181 | A | * | 8/1965 | West ...................... 137/625.17 |
| 3,220,693 | A | * | 11/1965 | Dickson ...................... 251/122 |
| 3,379,405 | A | | 4/1968 | Natho |

(Continued)

FOREIGN PATENT DOCUMENTS

| CH | 282823 | 10/1952 |
| EP | 0251101 | 1/1988 |
| GB | 952007 | 3/1964 |

OTHER PUBLICATIONS

Office Action dated Oct. 6, 2003, from U.S. Appl. No. 10/197,055, filed Jul. 16, 2002, issued as U.S. Patent No. 6,811,353.

(Continued)

*Primary Examiner* — Shane Bomar
*Assistant Examiner* — Wei Wang
(74) *Attorney, Agent, or Firm* — Klarquist Sparkman, LLP

(57) ABSTRACT

A valve assembly for use in aquifer liquid flow control in accordance with one embodiment can be used to deliver liquid to and/or from at least one selected aquifer in a plural aquifer system. In accordance with an embodiment, the valve can be used to route liquid to or from a first aquifer without delivering liquid to or from a second aquifer, or to or from the second aquifer without delivering liquid to or from the first aquifer. As an aspect of an embodiment, the valve assembly can be used to shut off the flow of liquid to both the first and second aquifers.

20 Claims, 16 Drawing Sheets

(56) References Cited

U.S. PATENT DOCUMENTS

| | | | |
|---|---|---|---|
| 3,497,004 A * | 2/1970 | Page, Jr. ................ 166/322 |
| 3,679,169 A | 7/1972 | Bedo et al. |
| 3,690,348 A | 9/1972 | Patterson |
| 3,735,541 A | 5/1973 | Vanderlinde |
| 3,761,053 A | 9/1973 | Bedo et al. |
| 3,908,536 A | 9/1975 | Bajcar |
| 3,937,247 A | 2/1976 | Van der Wal |
| 4,041,982 A | 8/1977 | Lindner |
| 4,047,695 A | 9/1977 | Cleveland et al. |
| 4,080,982 A * | 3/1978 | Maezawa ................ 137/219 |
| 4,114,851 A * | 9/1978 | Shivak et al. |
| 4,134,454 A * | 1/1979 | Taylor .................... 166/320 |
| 4,149,698 A | 4/1979 | Deaton |
| 4,154,263 A * | 5/1979 | Cary ................... 137/625.3 |
| 4,199,272 A | 4/1980 | Lacey |
| 4,248,305 A * | 2/1981 | Scarbrough et al. ....... 166/305.1 |
| 4,280,569 A | 7/1981 | Mount, II |
| 4,285,495 A * | 8/1981 | King ..................... 251/63.5 |
| 4,330,012 A * | 5/1982 | Chadwick ............. 137/625.48 |
| 4,375,821 A | 3/1983 | Nanao |
| 4,377,177 A | 3/1983 | Claycomb |
| 4,425,965 A * | 1/1984 | Bayh et al. ............... 166/106 |
| 4,431,058 A * | 2/1984 | Spencer et al. ............ 166/312 |
| 4,508,138 A | 4/1985 | Dixon |
| 4,520,846 A | 6/1985 | Dixon |
| 4,540,022 A * | 9/1985 | Cove .................... 137/625.3 |
| 4,569,370 A | 2/1986 | Witt |
| 4,582,551 A | 4/1986 | Parkes et al. |
| 4,621,655 A | 11/1986 | Roche |
| 4,691,778 A * | 9/1987 | Pyne .................... 166/320 |
| 4,787,599 A | 11/1988 | Nyboer |
| 4,821,622 A | 4/1989 | Burk |
| 4,941,507 A * | 7/1990 | Shenn ................. 137/625.37 |
| 5,014,746 A | 5/1991 | Heymann |
| 5,090,450 A | 2/1992 | Pelech et al. |
| 5,172,717 A | 12/1992 | Boyle et al. |
| 5,176,164 A | 1/1993 | Boyle |
| 5,316,081 A | 5/1994 | Baski et al. |
| 5,351,717 A * | 10/1994 | Saito .................... 137/625.12 |
| 5,503,363 A | 4/1996 | Wallace |
| 5,511,582 A | 4/1996 | Hudson |
| 5,547,029 A | 8/1996 | Rubbo et al. |
| 5,618,022 A | 4/1997 | Wallace |
| 5,706,861 A | 1/1998 | Wood et al. |
| 5,771,976 A | 6/1998 | Talley |
| 5,853,629 A | 12/1998 | Toyoda et al. |
| 5,871,200 A | 2/1999 | Wallace et al. |
| 5,960,816 A | 10/1999 | Mills et al. |
| 5,971,007 A * | 10/1999 | Harcourt et al. ......... 137/246.22 |
| 6,073,906 A | 6/2000 | Wallace |
| 6,206,021 B1 | 3/2001 | Hartman et al. |
| 6,286,594 B1 | 9/2001 | French |
| 6,334,486 B1 | 1/2002 | Carmody et al. |
| 6,338,466 B1 | 1/2002 | Wallace et al. |
| 6,811,353 B2 * | 11/2004 | Madison ................. 405/41 |
| 7,156,578 B2 * | 1/2007 | Madison ................. 405/41 |
| 7,849,925 B2 * | 12/2010 | Patel .................... 166/334.4 |
| 7,857,050 B2 * | 12/2010 | Zazovsky et al. ........... 166/278 |
| 2001/0045290 A1 * | 11/2001 | Pringle et al. ............. 166/386 |
| 2002/0066574 A1 * | 6/2002 | Leismer et al. ............ 166/375 |
| 2003/0024706 A1 * | 2/2003 | Allamon ................. 166/373 |
| 2003/0056951 A1 * | 3/2003 | Kaszuba ............... 166/250.01 |
| 2003/0094285 A1 * | 5/2003 | French ................... 166/380 |
| 2003/0180094 A1 * | 9/2003 | Madison ................. 405/36 |
| 2005/0039907 A1 * | 2/2005 | Madison ................. 166/67 |
| 2005/0092501 A1 * | 5/2005 | Chavers et al. ............ 166/386 |
| 2005/0115714 A1 * | 6/2005 | Millet et al. .............. 166/319 |
| 2006/0127184 A1 * | 6/2006 | Madison ................. 405/41 |
| 2006/0278399 A1 * | 12/2006 | Dwivedi et al. ............ 166/375 |

OTHER PUBLICATIONS

Office Action dated Mar. 2, 2006, from U.S. Appl. No. 10/940,787, filed Sep. 13, 2004, issued as U.S. Patent No. 7,156,578.

Office Action dated Mar. 27, from U.S. Appl. No. 11/352,136, filed Feb. 9, 2006.

* cited by examiner

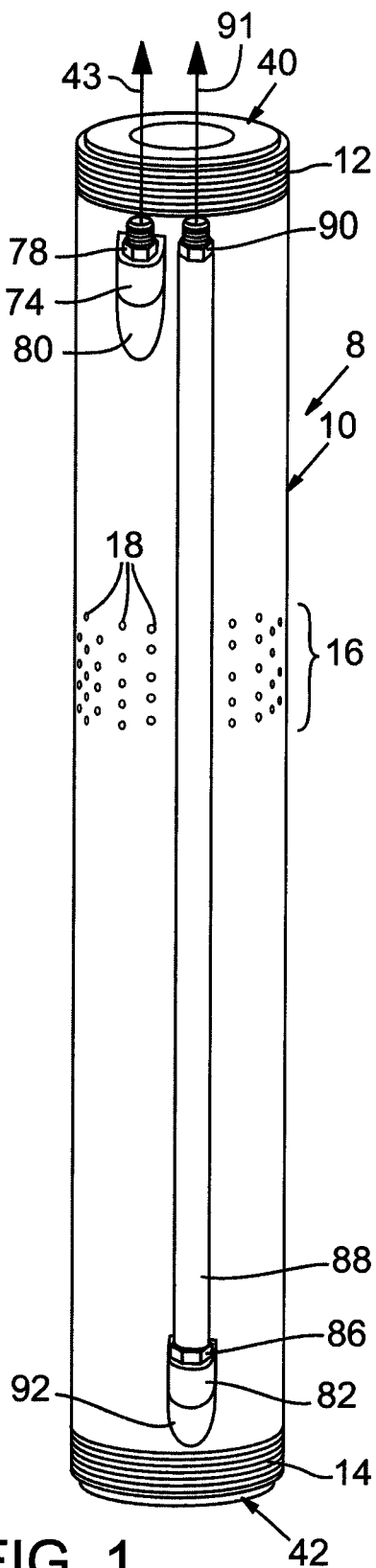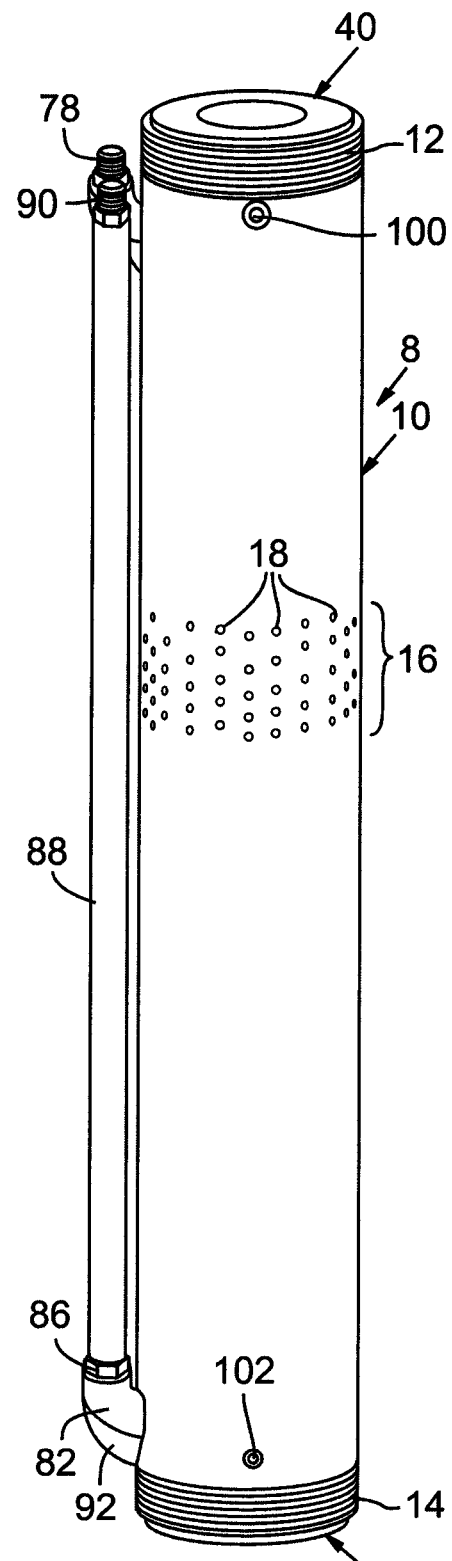

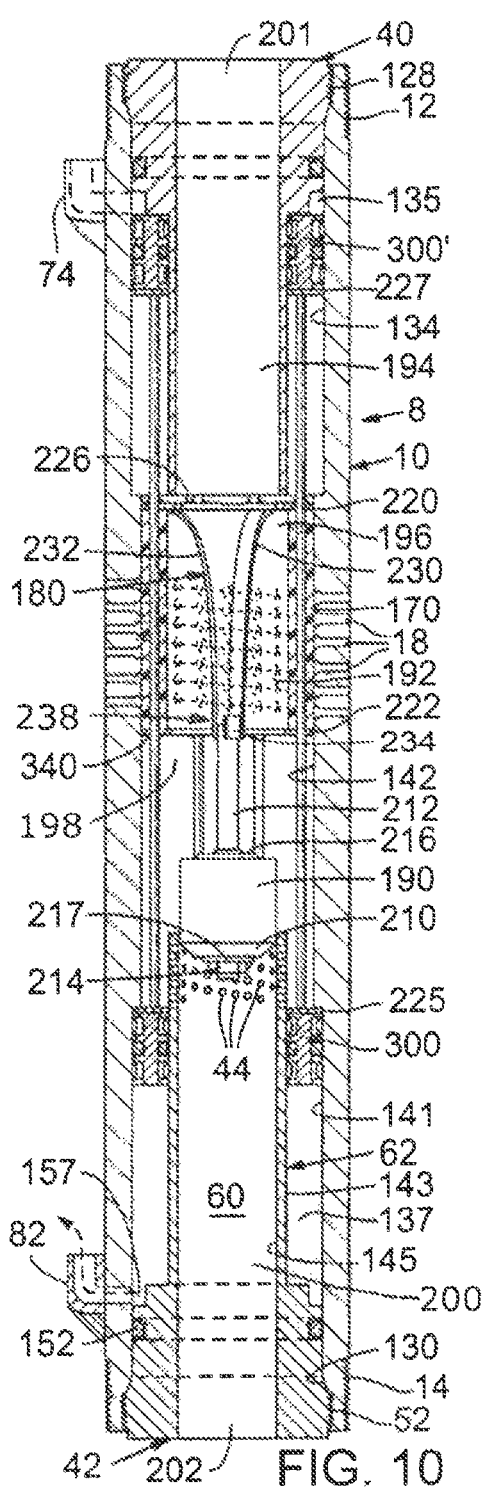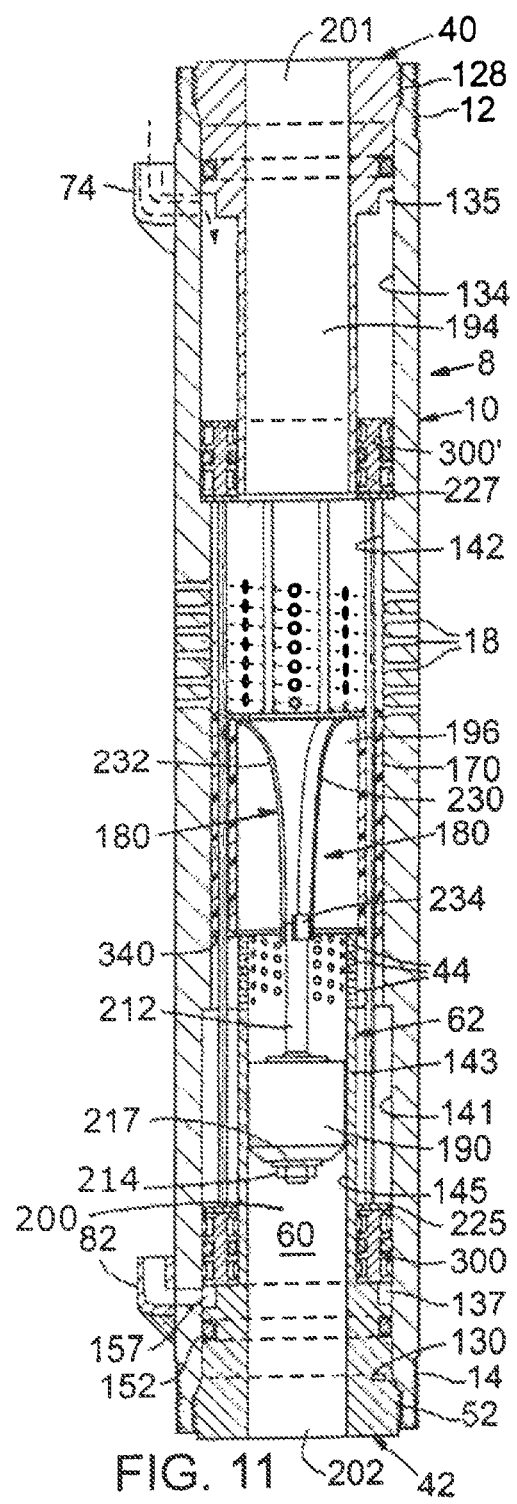

AQUIFIER FLOW CONTROLLING VALVE ASSEMBLY AND METHOD

CROSS-REFERENCE TO RELATED APPLICATION

This application claims the benefit of U.S. Provisional Application No. 61/345,943, entitled "AQUIFER FLOW CONTROLLING VALVE ASSEMBLY AND METHOD", and filed May 18, 2010.

FIELD

The technology described herein relates to valve assemblies and methods desirably used in controlling the flow of recharge liquid to at least one aquifer, the recovery of liquid from at least one aquifer, and/or in controlling both the flow of recharge liquid to and the recovery of liquid from at least one aquifer. In a desirable form, a single valve assembly included in a well pipe or casing can control the flow of liquid to and from a selected aquifer of a well that accesses at least two aquifers.

BACKGROUND

Various types of recharge valves have been used in the past for delivery of water to an aquifer for recharging the aquifer. However, these known devices suffer from a number of disadvantages.

For example, a need exists for a valve assembly that can be operated to selectively deliver liquid to and from first and second aquifers in a plural aquifer well environment. In addition, a need exists for an improved valve assembly and method for use in aquifer liquid flow control.

SUMMARY

A valve assembly for use in aquifer liquid flow control in accordance with one embodiment can be used to deliver liquid to or from at least one selected aquifer in a plural aquifer system. In accordance with an embodiment, the valve can be used to route liquid to or from a first aquifer without delivering liquid to or from a second aquifer, or to or from the second aquifer without delivering liquid to or from the first aquifer. As an aspect of an embodiment, the valve assembly can be used to shut off the flow of liquid to both the first and second aquifers. Related methods performed by such valve assemblies are also within the scope of this disclosure.

As an aspect of a number of embodiments, the valve assembly can effectively seal the flow of liquid to an untargeted one of plural aquifers in a cost-effective manner.

More than one valve assembly can be used to control access to additional aquifers.

In one application of an embodiment of a valve assembly, liquid of a first relative temperature can be routed to or from one aquifer and liquid of a second relative temperature can be routed to or from another aquifer. For example, liquid can be pumped from a first aquifer for use in providing heat to a heat exchanger. This results in cooling of the liquid. The now relatively cool liquid can be returned to a second aquifer other than the first aquifer. Also, liquid from the second aquifer can be used in a cooling or refrigeration application during which the liquid is warmed, such as in a heat exchanger. This now relatively warm liquid can be returned to the first aquifer.

In accordance with an embodiment, a valve assembly for use in aquifer liquid flow control comprises: a pipe section comprising a wall with an interior surface and an exterior surface and a liquid flow passageway through the pipe section; at least one aperture [and desirably plural apertures, which can be, for convenience, called housing aperture(s)] extending through the wall and communicating between a first portion of the liquid flow passageway and the exterior of the pipe section; at least one bypass passageway communicating from the first portion of the liquid flow passageway to a second portion of the liquid flow passageway; a first valve positioned within the interior of the pipe section and selectively movable from a first valve closed position in which the first valve overlies and blocks liquid flow through the at least one housing aperture to a first valve open position in which the first valve no longer overlies the at least one housing aperture at least in part such that liquid can flow through the at least one housing aperture to or from at least one aquifer when the valve assembly is installed in a well casing, wherein the first valve has flexibility such that when the first valve is in the first valve closed position and the valve assembly is installed in a well casing, a head of water pressure within the pipe section can urge the valve outwardly against the overlaid at least one housing aperture; a second valve positioned within the interior of the pipe section and selectively movable from a second valve open position to a second valve closed position; wherein in the second valve open position the second valve is positioned to at least partially open the bypass passageway such that liquid can flow through the liquid flow passageway through the pipe section with the liquid passing through the first portion of the liquid flow passageway, through the bypass passageway and through the second portion of the liquid flow passageway; wherein in the second valve closed position, the second valve closes the second portion of the liquid flow passageway to thereby block liquid flow through the liquid flow passageway through the pipe section; and a valve actuator coupled to the first valve and operable to selectively move the first valve between the first valve closed position and first valve open position, the valve actuator also being coupled to the second valve and operable to selectively move the second valve between the second valve open position and the second valve closed position. In this embodiment, the second valve can be in the second valve open position at least during a portion of the time that the first valve is in the first valve closed position such that liquid can flow through the first portion of the liquid flow passageway, the bypass passageway and the second portion of the liquid flow passageway to or from at least one aquifer when the valve assembly is installed in a well casing without flowing through the at least one housing aperture to another aquifer. In addition, the second value can be in the second valve closed position during at least a portion of the time that the first valve is in the first valve open position such that, when the valve assembly is installed in a well casing, the second valve blocks liquid flow through the second portion of the liquid passageway to or from said at least one aquifer and liquid is allowed to flow through the at least one housing aperture to or from said another aquifer.

The valve assembly embodiment can be combined with or installed into in a well bore hole accessing at least first and second aquifers with well pipe being connected to the valve assembly both above and below the valve assembly. Bore packing can be positioned in the bore hole so as to block the flow of liquid in the bore hole outside of the well pipe and valve assembly and between the first and second aquifers. At least one housing aperture communicates through the pipe section and bore hole to one of the first and second aquifers when a first valve is in a first valve open position. A bypass passageway communicates through the second portion of the liquid passageway and through the bore hole to another of the first and second aquifers other than said one of the first and second aquifers when the second valve is in a second valve open position. By selectively controlling the first and second valves, liquid can be directed to or from either of the first and second aquifers.

In accordance with another aspect of an embodiment, a first valve can be selectively moved or movable to a first valve shut off position in which the first valve overlies and blocks the flow of liquid through at least one housing aperture. In addition, a second valve can be selectively moved or movable to a second valve shut off position in which the second valve closes a bypass passageway and blocks liquid flow through the valve. The valve actuator can be operable to move the second valve to the second valve shut off position during at least a portion of the time the first valve is in the first valve shut off position. As a result, when the valve is installed in a well casing and the first and second valves are in their respective shut off positions, liquid does not flow through the valve or through the at least one housing aperture.

As another aspect of an embodiment, the first valve closed position and the first valve shut off position are at different valve positions in the valve pipe section from one another. Also, in an embodiment, the second valve closed position and the second valve shut off position are at different positions from one another in the valve pipe section.

As a further aspect of an embodiment, the second valve can be coupled to the first valve for movement with the movement of the first valve and a valve actuator can comprise a common actuator for moving both the first and second valves simultaneously.

As another aspect of an embodiment, a first valve can comprise an annular valve body comprising a polymer material with a valve exterior surface and a valve interior surface, the valve body allowing liquid to flow through the valve body and through the first portion of the liquid flow passageway. In addition, the first valve can be moved between a first valve closed position in which the valve exterior surface overlies a portion of the interior surface of the wall of the valve housing pipe section and entirely overlies the at least one aperture and a first valve open position in which the valve exterior surface of the valve body no longer entirely overlies the at least one aperture. In addition, the second valve can comprise a plug. As a more specific example, the first valve can comprise a seamless valve cylinder of a polymer material with an exterior surface that is sized to slide along the interior of the valve housing pipe section.

In accordance with an embodiment, a first valve can comprise a hollow right cylindrical valve having an interior wall with an inner wall diameter and first and second end portions. A first ring can be positioned adjacent or abutting the first end portion and a second ring can be positioned adjacent to or abutting the second end portion. The first ring can have an inner ring diameter that is less than the inner wall diameter with an interior periphery portion of the first ring extending inwardly of the interior wall of the first valve. A support can be mounted to the interior periphery portion of the first ring, extending away from the first ring and through the interior of the first valve, and terminating in a distal end support portion. The plug can be mounted to the distal end support portion. As a more specific aspect of an embodiment, a plurality of push rods can be coupled to the first ring and can extend from the first ring toward a first piston. The push rods can also be coupled to the second ring and can extend from the second ring toward the second piston.

As a further aspect of an embodiment, the valve assembly can comprise an internal projection, such as a conduit section coupled to a valve pipe section. The conduit section can comprise a first conduit end portion and a second conduit end portion with at least a portion of a second portion of a liquid flow passageway through the valve pipe section communicating between the first and second conduit end portions. The conduit section can also comprise a conduit wall with an interior surface and an exterior surface. A bypass passageway can comprise at least one conduit bypass aperture through the conduit wall that communicates between a first portion of the liquid passageway through the valve pipe section and the second portion of the liquid passageway. In addition, a plug can be selectively moved or movable from a second valve open position wherein the plug blocks the first conduit end portion while permitting the flow of liquid through the first portion of the liquid passageway. In this state, liquid can flow through the at least one conduit bypass aperture and the second portion of the liquid passageway and thereby through the pipe section at least during a portion of the time that a first valve is in a first valve closed position to block the flow of liquid through at least one housing aperture through the pipe section. The plug can also be selectively moved or moveable to a second valve closed position wherein the plug is positioned to block liquid flow through the second portion of the liquid passageway and also to block the flow of liquid through the at least one conduit bypass aperture at least during a portion of the time that the first valve is in the first valve open position such that liquid can flow through the at least one housing aperture between the interior and exterior of the pipe section without flowing through the second portion of the liquid flow passageway and thereby through the valve.

In accordance with another aspect of an embodiment, a first valve can be selectively moved or movable to a first valve shut off position in which the exterior surface of the valve body overlies a portion of the interior surface of a valve housing wall and entirely overlies at least one housing aperture to block the flow of liquid through the at least one aperture. Also, a plug can be selectively moved or movable to a second valve shut off position in which the plug blocks the flow of liquid through a second portion of a liquid flow passageway through the valve at least during a portion of the time that the first valve is in the first valve shut off position. With both the first and second valves in their respective shut off positions, the valve prevents the flow of liquid both through the liquid flow passageway and through the at least one housing aperture.

In accordance with a further aspect of an embodiment, the valve assembly can comprise a projection such as a conduit section coupled to a pipe section that comprises a housing for the valve assembly. The pipe section can define a liquid flow passageway therethrough. The conduit section can comprise a first conduit end portion and a second conduit end portion with at least a portion of the liquid flow passageway communicating between the first and second conduit end portions. The conduit section can also comprise a conduit wall with an interior surface and an exterior surface. A bypass passageway can comprise a liquid flow path past a valve member, such as a plug, and into the first conduit end portion at least when the plug is positioned outside of the conduit section. The plug can be selectively moved or movable to a second valve open position wherein the plug is positioned exteriorly of the conduit section such that liquid can flow past the plug and into the first end portion of the conduit section and through the valve assembly. The plug can be in the second valve open position at least during a portion of the time that a first valve is in a first valve closed position wherein the first valve blocks at least one housing aperture between the exterior and interior of the pipe section. The plug can be moved or movable to a second valve closed position wherein the plug is inserted at least partially into the first end portion of the conduit section to block liquid flow through the bypass passageway and through the conduit section. The plug can be in the second valve closed position at least during a portion of the time that the first valve is in a first valve open position wherein the first valve no longer entirely overlays the at least one housing aperture such that liquid can flow through the at least one aperture between the interior and exterior of the pipe section without flowing through the conduit section and thereby through the valve assembly.

As another aspect of an embodiment, a first valve can be selectively moved or movable to a first valve shut off position in which the exterior surface of the valve body overlies a portion of the interior surface of the wall and entirely overlies the at least one aperture to block the flow of liquid through the at least one aperture. A plug can be selectively moved or movable to a second valve shut off position in which the plug is inserted into the first end portion of the conduit section so as to block the flow of liquid through the bypass passageway and through the second portion of the liquid flow passageway at least during a portion of the time that the first valve is in the first valve shut off position, whereby the flow of liquid is blocked through the valve and also through the at least one housing aperture.

As a further aspect of an embodiment, a valve actuator can be coupled directly or indirectly to a first valve and operable to move the first valve between a first valve closed position and a first valve open position. The valve actuator can comprise first and second hydraulic pistons coupled to the first valve, a first hydraulic liquid chamber associated with the first piston and a second hydraulic liquid chamber associated with the second piston. One of the first and second pistons is movable in a direction to urge the first valve toward said first valve closed position upon delivery of hydraulic liquid to the hydraulic liquid chamber associated with said one of the first and second pistons. In addition, the other of the first and second pistons is movable in a direction to urge the first valve toward the first valve open position upon delivery of hydraulic liquid to the hydraulic liquid chamber associated with the said other of the first and second pistons. A second valve can be coupled directly or indirectly to the first valve such that the valve actuator moves the second valve to a second valve open position with the movement of the first valve to the first valve closed position and such that the valve actuator moves the second valve to a second valve closed position with the movement of the first valve to the first valve open position. The second valve can comprise a plug coupled by a valve support to the first valve to thereby couple the first and second valves together for simultaneous movement between valve positions.

As yet another embodiment, a valve assembly for use in aquifer liquid flow control comprises: housing means for defining a liquid passageway for the passage of liquid therethrough and for defining at least one aperture for communicating from the liquid passageway to the exterior of the housing means; and valve means for selectively blocking the flow of liquid through the at least one aperture while permitting the flow of liquid through the liquid passageway and for selectively blocking the flow of liquid through the liquid passageway while allowing the flow of liquid through the at least one aperture.

As a further aspect, a valve assembly can be included as a section in a well pipe positioned in a well bore, the well pipe extending below a first aquifer and a second aquifer being positioned below the first aquifer, the well bore being provided with packing to block the passage of liquid in the well bore outside of the well pipe between the first and second aquifers. The valve assembly can comprise: means for selectively opening at least one aperture communicating with the first aquifer and for closing an opening communicating with the second aquifer; and means for closing the at least one aperture communicating with the first aquifer and for opening the opening communicating with the second aquifer.

As yet another aspect of an embodiment, an aquifer flow control method comprises: placing a valve assembly in a section of well pipe positioned in a well bore, the well bore passing through a first aquifer and at least to a second aquifer and the well pipe extending at least below the first aquifer; blocking the flow of liquid between the well pipe and well bore at a location of the well bore between the first and second aquifers; permitting liquid flow through at least one housing aperture from the interior of the valve assembly to one of the first and second aquifers or through the at least one housing aperture from one of the first and second aquifers to the interior of the valve assembly with the flow of liquid to the other of the first and second aquifers being blocked; and permitting liquid flow through the valve assembly to one of the first and second aquifers or from one of the first and second aquifers through the valve assembly with the at least one housing aperture being blocked so that liquid flowing through the valve assembly does not flow through the at least one housing aperture.

As a further aspect, the method can include the act of permitting the flow of relatively high temperature liquid to and from one of first and second aquifers and permitting the flow of relatively low temperature liquid to and from the other of the first and second aquifers, whereby the relatively high temperature liquid can be used for heat generation purposes when delivered from said one of the first and second aquifers and for storing heat when delivered to said one of the first and second aquifers, and whereby the relatively low temperature liquid can be used for cooling purposes when delivered from the other of the first and second aquifers and can be used for storing relatively low temperature liquid when delivered to the other of the first and second aquifers.

The method can also comprise other acts, such as the act of selectively blocking the flow of liquid through the valve assembly and through the first aperture.

The foregoing and other objects, features, and advantages of embodiments will become more apparent from the following detailed description, which proceeds with reference to the accompanying figures.

BRIEF DESCRIPTION OF THE DRAWINGS

FIGS. 1 and 2 are perspective views of an embodiment of a valve assembly in accordance with this disclosure.

FIG. 10 is a vertical sectional view of an embodiment of a valve assembly showing a first valve member, such as a first valve in position to block the flow of liquid through a plurality of housing apertures overlaid by the first valve. FIG. 10 also shows a second valve member, such a second valve in the form of a plug shown positioned to allow the flow of liquid through bypass apertures in a conduit section and thereby through the valve.

FIG. 11 is a vertical sectional view like that of FIG. 10 except showing a first valve in a position to allow the flow of liquid through housing apertures no longer overlaid by the first valve and with a plug shown in a position to block the flow of liquid through the conduit section and thereby to block the flow of liquid through the valve.

DETAILED DESCRIPTION

Figure 3:
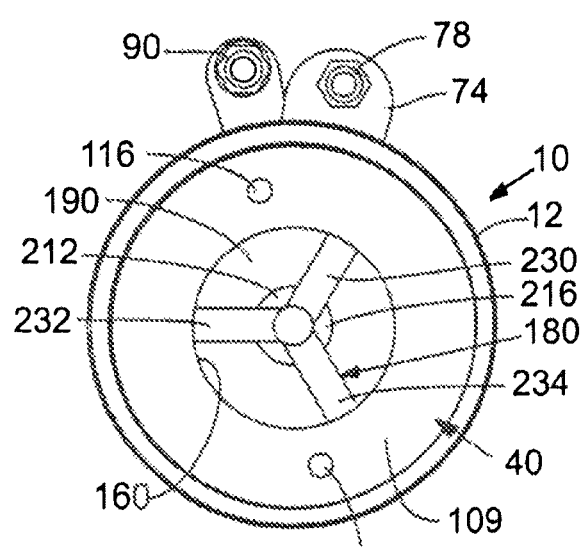
FIG. 3 is a top view of the valve assembly of FIG. 1.

The description proceeds with reference to several exemplary embodiments. The present invention is directed toward novel and non-obvious features and methods acts disclosed herein both alone and in various combinations and subcombinations with one another as set forth in the claims.

FIG. 1 illustrates a valve assembly 8 comprising a pipe section 10 that can be included in a pump column of a well. For example, pipe section 10 can be a six-inch inside diameter steel pipe having threads 12, 14 at its opposite ends for coupling to associated pipe components, such as to well casing sections above and below the valve assembly. The pipe section 10 includes at least one aquifer communication aperture or outlet through which liquid (e.g. water) can pass to and/or from an aquifer when the valve assembly is installed in a well. Desirably, a plurality of aquifer communicating apertures are provided through the pipe section wall at spaced locations about the circumference of pipe section 10. In FIG. 1, the aquifer communication housing apertures are arranged in a spiral pattern along a portion 16 of pipe section 10 with some of these apertures being indicated at 18 in FIGS. 1 and 2. The pipe section 10 can be of any suitable length and, in FIGS. 1 and 2, is shown as a four foot long pipe section In the FIGS. 1 and 2 example, the aquifer communication apertures 18 are shown intermediate the respective ends of the pipe section 10 and about one-third of the distance from the upper end of the pipe section toward the lower end of the pipe section. It should be understood that the valve assembly disclosed herein can be installed in other orientations other than vertical and can, for example, be inverted.

It should be noted that at least one such aperture 18 is provided. However, it is more desirable to include a plurality of apertures spaced about the circumference of pipe section 10. This approach disperses liquid being used to re-charge an aquifer, or being drawn from an aquifer, through a plurality of openings and reduces the mining of the aquifer that could otherwise take place by a high volume of water passing through one or only a few apertures. The size and number of apertures can be varied for a particular application. That is, for a given head pressure during recharging of a well, for example, and a desirable flow rate of recharge water into an aquifer, one can determine the number and size of apertures that are desirable. In the illustrated embodiment, 40 openings are provided which are each 0.25 inch in diameter. These openings can be arranged in various arrangements or patterns, and can be arranged in a spiral pattern as shown in FIGS. 1 and 2, as opposed to being in respective rings with each ring being at the same elevation. As a result, the integrity and strength of the pipe section 10 is increased. Although less desirable, the openings can be arranged in rings or other arrangements (this is also true of the conduit bypass openings discussed below in one embodiment). In addition, as a valve member is moved upwardly or downwardly with a spiral arrangement of housing apertures, the change in exposed apertures is almost linear. This facilitates the control of the flow rate during aquifer recharge and withdrawal operations. These apertures can have rounded edges at the interior side of the pipe section to facilitate the smoother flow of water through the apertures during an aquifer recharge operation. In addition, the apertures can have rounded edges at the exterior side of the pipe section as well. The use of rounded, beveled or otherwise smoothed apertures reduces the possibility of aperture boundaries scratching a valve as it moves or is slid past the apertures as explained below.

The valve assembly 8 of FIGS. 1 and 2 can use a valve such as explained below. The operation of the valve assembly can be controlled in the manner of the valve of U.S. Pat. No. 6,811,353 and U.S. Pat. No. 7,156,578. U.S. Pat. Nos. 6,811,353 and 7,156,578 are incorporated herein in their entireties.

Figure 5:
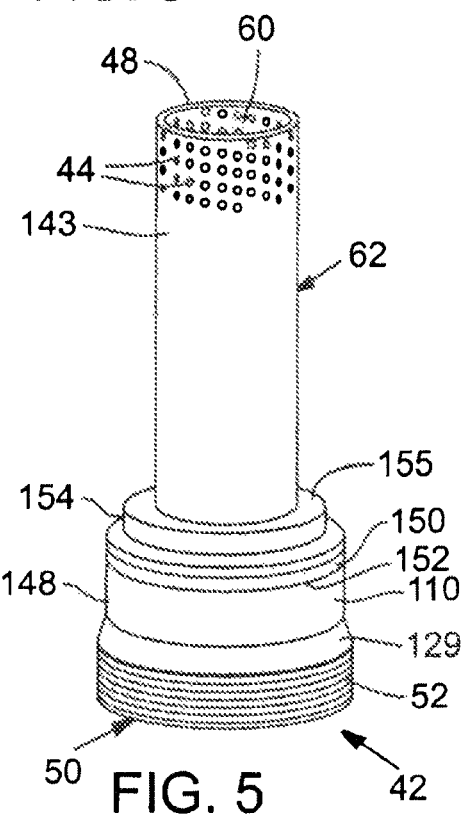
FIG. 5 is a perspective view of one form of projection, in this case a conduit section with apertures at an upper end portion thereof, for inclusion in the valve assembly as explained below while providing a liquid flow passageway through the conduit section.

The illustrated valve assembly 8 comprises first and second end members, such as comprising end caps 40, 42 respectively inserted into the top and bottom of the pipe section 10 as shown in FIGS. 1 and 2. These end cap portions can be replaced with other configurations, such as projections and/or conduit sections positioned within the interior of the pipe section 10. Exemplary end cap portions 40, 42 are described in greater detail below and can be identical to one another. However, in one embodiment, end cap 42 is provided with at least one bypass opening, and desirably a plurality of such openings, some of which are indicated at number 44 in FIG. 5. In FIG. 5, the openings 44 are adjacent to the distal end 48 of the end cap portion 42. A base portion 50, opposite to distal end 48, is provided with threads in this embodiment such that end cap 42 can be threaded into threads 56 (FIG. 4) at the base end 58 of pipe section 10. A liquid flow passageway 60 extends through end cap portion 52 from the distal end to the base end with a portion of this passageway being defined by an annular conduit section or portion 62 projecting away from base 52. Conduit portion 62 comprises a wall penetrated by the openings or bypass passageways 44 that extend from the interior to the exterior of conduit 62 in this example. The openings 44 can be sized and arranged in the same manner as the openings 18. In the embodiment shown in FIG. 5, the portion of conduit 62 below the openings 44 is opening free.

Referring to FIGS. 1 through 4, a first coupler 74, mounted to the exterior of housing 10, defines an internal passageway 75 (FIG. 4) communicating with an interior portion 77 of housing 10 through a corresponding port or passageway 76 through the housing wall. A hydraulic line fitting 78 (FIGS. 1 and 2) can be secured to coupling 74, such as being threaded into a threaded fitting receiving portion of the coupling. A hydraulic line 43, shown schematically in FIG. 1, can be connected to fitting 78 when the valve assembly is in use. Line 43 can be used for delivering hydraulic fluid to, and receiving such fluid from, the valve assembly for use in operating a piston (as described below) to adjust valve positions. Typically, food grade hydraulic fluid is used in operating the valve assembly so as to protect the water supply in the event the hydraulic fluid leaks from the system. Although alternative hydraulic lines can be used, hydraulic lines for operating the pistons can, for example, be 0.25 inch diameter stainless steel tubing. A tapered deflector 80 can be positioned at the underside of fitting 74 (and can, for example, be a part of fitting 74). The deflector 80 deflects the valve assembly away from obstructions as the valve assembly and well pipe containing the assembly is lowered into a well. Deflector 80 also shields the coupling 74.

In addition, in the embodiment of FIGS. 1 and 2, a second coupler 82 defines a hollow interior passageway 83 (FIG. 4) communicating through a port 84 and with an interior portion 85 of a housing or pipe section 10. Coupler 82 can be internally threaded so as to receive a hydraulic line fitting 86 (FIGS. 1 and 2) and the lower end of a hydraulic line section 88. The upper end of line section 88 terminates in a hydraulic fitting 90 that can be coupled to a hydraulic line, such as to a line shown schematically as line 91, when the valve assembly is in use. Line 91 can be used to deliver hydraulic fluid to and from the interior portion 85 (FIG. 4) of the housing to operate a valve actuating piston as explained below. A tapered shield or deflector 92 can be positioned below coupler 82 for functioning in the same manner as the deflector 80 described above. The ports 76, 84 that communicate through respective openings 75, 83 of the respective couplings 84, 82, are desirably offset from one another (see FIG. 1) so that fittings 78, 90 clear one another at the upper end of the illustrated valve assembly.

Again, it should be noted that the valve assembly 8 can be used in other orientations, such as inverted from the orientation shown in FIGS. 1 and 2. In such a case, the couplers 74 and 82 can also be inverted.

The respective end caps 40, 42 can be inserted into the respective ends of pipe section 10 and desirably are threaded into the pipe section. In addition, retainers, such as set screws 100, 102 (FIG. 2) can be used to engage the respective end caps 40, 42 to prevent them from separating from the pipe section 10 during use. The illustrated set screws 100, 102 are each threaded through a respective set screw receiving opening of pipe section 10 and into engagement with the associated one of the respective end caps.

Figure 4:
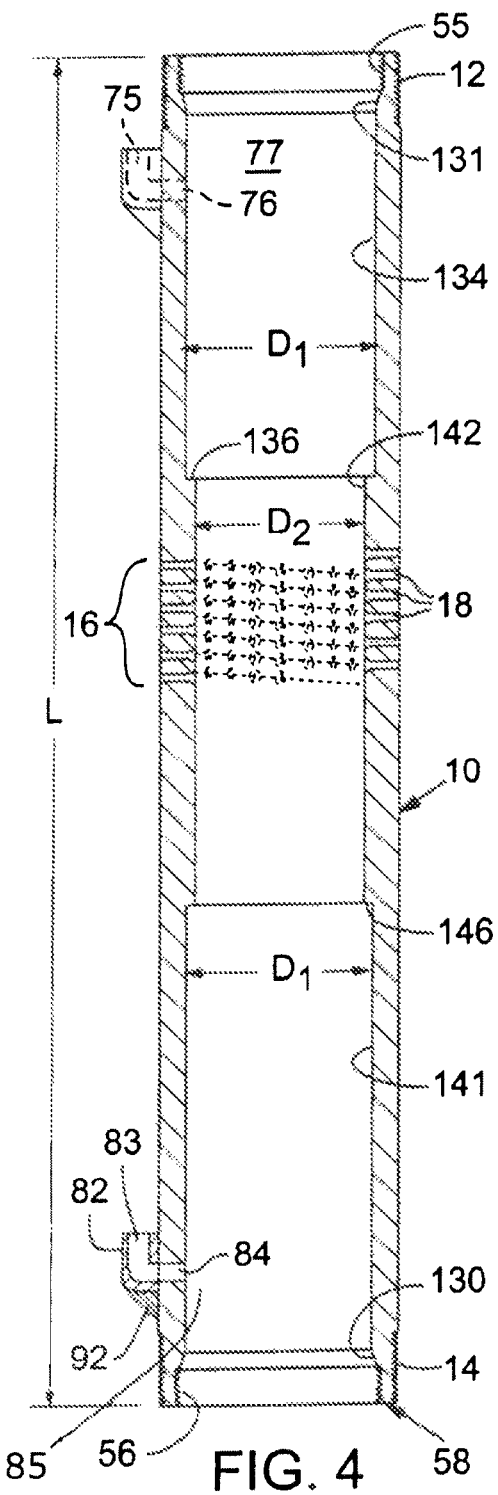
FIG. 4 is a vertical sectional view through a pipe section or housing included in the valve assembly of FIG. 1.

With reference to FIGS. 3 and 4, end cap 40 can be identical to end cap 42 although typically no bypass openings 44 are provided in end cap 40. As explained below in connection with an alternative embodiment, the openings 44 can also be eliminated from end cap 42. Also, the conduit portion 62 of end cap 42 can be elongated in the axial direction in comparison to the length of a corresponding conduit portion (not shown) of end cap 40 so as to provide an aperture free area (below apertures 44 in FIG. 5) along which a piston can slide. If a piston were to slide over apertures 44, although this construction can be used, the apertures 44 can scratch or mar the piston and interfere with its sealing properties.

Because of the similarity between end caps 40 and 42 in this embodiment, only end cap 42 will be described in detail. End cap 42 is desirably of annular construction with a body 110 (FIG. 5) provided with a longitudinally and axially extending liquid or water flow opening 60 or liquid passageway as previously mentioned. The opening 60 can be circular in cross-section and can have a diameter that is varied depending on factors such as the diameter of the well pipe within which the valve assembly is to be used. However, the outer diameter of conduit portion 62, in one embodiment is less than the diameter D1 of housing 10 (see FIG. 4) such that liquid can flow between an interior wall 141 of the housing 10 and the exterior wall 143 (FIG. 5) of the conduit portion 62 as explained below. As a specific example, in a valve for use with 6 inch outside diameter well pipe, that has an approximately 5 inch inside diameter, end cap openings 60 can have a diameter of about 2.8 inches, as a specific example with the outer diameter of the conduit portion 62 being about 3.8 inches in one example. As another example, a valve assembly for 8 inch well pipe can have end caps with respective longitudinally extending openings that are about 4 inches in diameter. Also, a valve assembly for a 10 inch well pipe can have end caps with center openings of 6 inches in diameter. Again, these dimensions can be varied. The length of the valve assembly can be relatively short. For example, the length L in FIG. 4 can be about 48 inches. Because of the shortness of the valve assembly of the illustrated embodiment, even with a somewhat restricted opening 60, little pressure loss occurs across the valve assembly as water flows through the valve assembly.

In the embodiment of FIG. 3, end cap 40 is provided with first and second blind holes 114, 116 that are diametrically located across the end cap body 109 and are exposed at the surface of the body of the end cap 40. A tool, such as a wrench having projecting pegs positioned for insertion into the respective openings 114, 116, can be used to tighten the valve end cap 40 within the end of pipe section 10 and also to remove the end cap, as desired. End cap 42 can be similarly constructed with blind holes.

With reference to FIG. 4, one form of pipe section 10 for a valve assembly of FIGS. 1 and 2 is illustrated. The illustrated pipe section has exterior threads 12, 14 at the respective ends of the pipe section for coupling, for example, to other lengths of well pipe or casing when the valve assembly is installed for use. The upper end portion of pipe section 10 has internal threads 55 for threadedly receiving external threads 128 (FIG. 10) on the body of end cap 40 for use in threadedly interconnecting these members. In the same manner, the internal threads 56 (FIG. 4) of the pipe section 10 threadedly receive the threaded portion 52 (FIG. 5) of the end cap 42. Interiorly (meaning toward the center of pipe section 10) of threads 52, end cap 52 comprises an annular tapered wall or shoulder section 129 of a diameter that is reduced in a direction extending inwardly into the interior of the pipe section. Shoulder section 129 can engage a corresponding shoulder 130 (FIG. 4) of pipe section 10 to limit the extent of insertion of the end cap member 42 into the pipe section. Similar features can also be provided in end cap 40 and at the end cap receiving portion of pipe section 10 that receives cap member 40. When cap member 42 is threaded into the pipe section 10 and shoulder 129 bottoms out against wall section 130, the position of cap member 42 is at a known established location within the valve assembly. A similar tapered annular shelf 131 (FIG. 4) is provided at the upper end of the pipe section 10.

Referring again to FIG. 4, a first wall section 134 is positioned inwardly of an upper tapered section 131. Wall section 134 is of a first cross-sectional dimension and, in this example, comprises a right cylinder having a diameter D1. The dimension D1 can be varied depending on the size of the valve assembly, such as with the diameter of the well pipe with which the valve assembly is to be used. Although variable, for a pipe section 10 having a 6 inch outside diameter, dimension D1 can be, for example, about 5.4 inches. A portion of the wall surface 134 in this embodiment desirably defines a portion of a hydraulic chamber 135 (see FIGS. 10, 11) as explained below. The valve assembly desirably includes a piston stop operable to limit the motion of one or more pistons within the valve assembly. Although various forms of a stop (e.g., projections) can be used, in one specific example, the piston stop comprises a shelf 136 of an annular configuration that is formed in the interior surface of pipe section 10 at an inward end of wall section 134. A valve guiding wall section 142 is provided of a second cross-sectional dimension. In this example, wall section 142 is a right cylinder with a diameter D2, is positioned inwardly of shelf 136. As explained below in connection with one embodiment, a valve member, such as a first valve member, can slide along wall section 142 to respectively open and close the openings 18 through the pipe section 10 depending upon whether, and to the extent that, the first valve member overlies the openings 18.

As can be seen in FIG. 4, in the orientation shown, a lower portion of wall section 142 is provided without the openings 18. When a first valve member is moved to a position adjacent the lower portion of the wall section 142, the valve desirably does not impede the flow of water through the openings 18. Conversely, as the valve is shifted upwardly in FIG. 4 to a position which overlies some or all of the openings 18 (all of them desirably being overlaid when the valve is in its uppermost or most closed position), the flow of liquid through openings 18 is impeded or blocked. The extent of such blockage depends upon the valve position. The term closed or blocked does not mean total sealing of the housing openings as some leakage can take place, but desirably the first valve substantially totally or totally seals the housing openings when closed. The diameter D2 can also be varied. In one specific example, the diameter D2 is 5 inches for a 6 inch outside diameter pipe section 10. The lower portion of pipe section 10 in the illustrated embodiment also comprises a wall section 141 positioned inwardly of annular tapered wall section 130. Wall section 141 can also be a right cylinder and desirably defines a portion of a hydraulic chamber 137 (FIGS. 10 and 11) in this specific example. Wall section 141 can have the same diameter D1 as wall section 134. The inward most end of wall section 141 can terminate in an annular piston stop 146 that can be like stop 136. Other forms of a piston stop can be used in the lower portion of the pipe section.

FIG. 5 illustrates an embodiment of an exemplary lower end cap 42. Cap 42 comprises external threads 52 for threading into the threads 56 (FIG. 4) of the pipe section 10. An annular tapered shoulder section 129 of end cap body 110 is provided to engage annular wall surface 130 of pipe section 10 when these components are assembled. The body 110 of end cap 42 can also comprise a cylindrical wall portion 148 having an outside cross-sectional dimension, such as a diameter, that desirably corresponds to and is slightly less than the diameter D1. The space between end cap wall portion 148 and wall section 141 desirably is tightly sealed when the end cap 42 is in place. For example, wall section 148 can be provided with at least one inwardly extending seal receiving groove 150 within which a seal, such as an o-ring 152, can be placed. The o-ring 152 seals the base of the valve assembly and hydraulic chamber 137 (FIGS. 10, 11) at this location.

The body 110 desirably has a wall portion or section 154 that is of a reduced cross-sectional dimension at a location adjacent to wall section 148. The wall section 154 is positioned further inwardly into pipe section 10 than the wall section 148. As a result, an annular passageway 157 (FIGS. 10, 11) is provided to facilitate the flow of hydraulic fluid through opening 84 and into the hydraulic fluid receiving chamber 137 as described below. Body 110 can also include an annular shelf or piston stop surface 155 operable to limit the movement of a piston in the direction toward the adjacent end 14 of the pipe section 10. Other forms of a piston stop can also be used. Body 110 also comprises, in this embodiment, a piston guide such as cylindrical piston engaging wall section 143 that corresponds to the exterior surface of conduits section or portion 62 in the case of a right cylindrical conduit section 62. The liquid flow passageway 60 in this example extends axially through conduit section 62 and through the other portions of body 110 to the exterior of end cap 42. The passageway 60 in this example is bounded by an interior wall surface 145. The conduit section wall surface 143 comprises one form of an annular piston guiding surface along which a piston can be shifted. The wall surface 143 also desirably defines a portion of the hydraulic chamber 137. Other portions of the chamber 137 are defined, in this example, by sections 154, 155 of the end cap 42, and by a portion of the wall section 141. This will become more apparent from the discussion below.

With reference to FIG. 3, the liquid flow opening 160, in this embodiment, extends axially through the upper cap member 40. In addition, one form of a valve support 180, such as a support bracket is visible in FIG. 3. Valve support 180 supports a valve member 190 operable as explained below to selectively block the flow of liquid through passageway 60 to thereby prevent the flow of liquid through the pipe section 10 and the valve assembly.

An exemplary form of valve member 190, in the form of a plug, and of the support 180, are shown in FIGS. 10 and 11. In addition, an exemplary form of a valve 170 that is selectively operable or positionable to close the apertures 18 is also shown in FIGS. 10 and 11.

FIGS. 10 and 11 illustrate a vertical sectional view through a portion of pipe section 10 containing an exemplary aquifer valve in accordance with one embodiment. The illustrated valve comprises first and second valve members or portions 170, 190. These valve portions can be separately and independently operable by respective actuators to various closed and open positions using a separate actuator for each valve member. For example, hydraulic pistons or cylinders can be used for this purpose. Electrically controlled actuators can also be used. However, in the illustrated embodiment of FIGS. 10 and 11, the valve members 170, 190 are coupled together, in this case directly connected together, by support 180 so that they move simultaneously and together between selected valve positions as explained below.

With reference to FIGS. 10 and 11, the illustrated embodiment (in the orientation shown) comprises an upper or first valve member 170 positioned within the interior of pipe section 10 and moveable between a first closed position (shown in FIG. 10) in which the valve member 170 overlies and closes or seals the apertures 18 to a second open position in which the valve member 170 does not entirely overlie the apertures and more desirably clears all of the apertures such that liquid can flow through the apertures without interference by the valve member 170. An example of an open position of valve member 170 is shown in FIG. 11. In the orientation shown in FIGS. 10 and 11, valve member 170 is moved from a closed position downwardly to the open position. If the assembly is inverted, this direction of motion can be reversed. The valve member 170 is configured in this embodiment to allow liquid to flow through the valve member, in this case through an interior passageway 192 through the valve member. Thus, the valve member 170 can be annular in shape, with a right cylindrical configuration being a desirable form of valve member. As can be seen in FIG. 10, when valve member 170 is in the closed position, a liquid flow passageway exists through a first passageway portion comprising an interior portion 194 of cap member 40, through a portion 196 of the valve member 170, and into a portion of the passageway 198 located below the valve member. Passageway portions 194, 196, and 198 can be deemed one portion of a fluid flow passageway through the valve assembly. In addition, a passageway portion 200 is defined by conduit section 62 of end cap 42 that can be deemed a second passageway portion. Passageway portion 200 can communicate via an opening 202 with a pipe section coupled to the lower end of pipe section 10. Similarly, an opening 201 through end cap 40 can communicate from passageway portion 194 to a pipe section connected to the upper end of pipe section 10.

As can be seen in FIG. 10, when valve section 170 is in the closed position, lower valve portion 190 is positioned above at least one, and desirably a plurality of or all of the apertures 44. Consequently, passageway portion 198 communicates through apertures 44 with passageway portion 200 with openings 44 thereby providing a bypass passageway. Consequently, valve member 190, which can be in the form of a plug shaped to mate with conduit section 200 and close or seal the conduit section 200 when valve member 190 is inserted further into the conduit section, is in an open position. When valve member 190 is in an open position, liquid can pass between passageways 198, 200 through openings 44. Thus liquid can flow through the pipe section 10, between openings 201, 202 and through the valve assembly. Simultaneously, because valve member 170 is in a closed position, liquid flow through apertures 18 is blocked.

Figure 12:
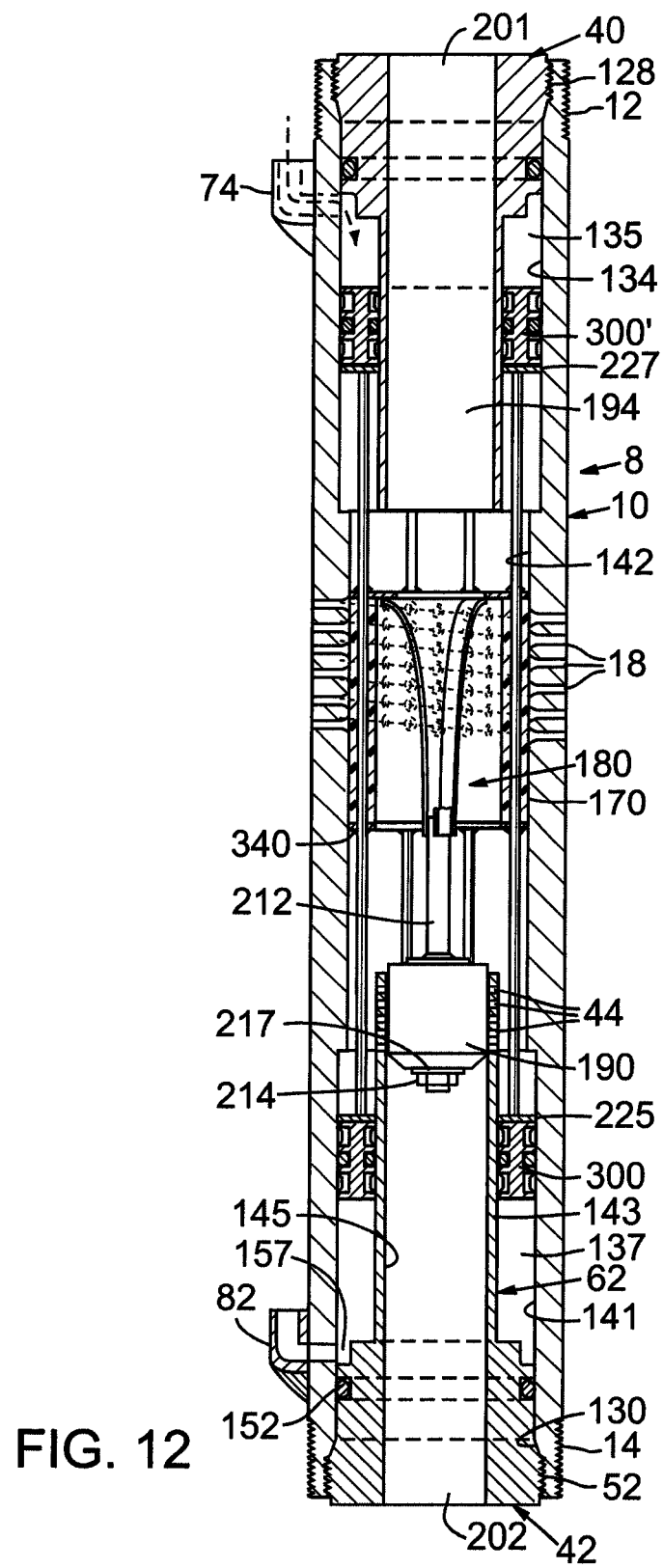
FIG. 12 is a vertical sectional view through an embodiment of a valve assembly like that of FIG. 10, with the first valve and second valve being positioned to respectively block the flow of liquid through housing apertures in the valve and through the conduit section.

In comparison, when valve member 170 has been shifted to the open position shown in FIG. 11, the valve member 190 is inserted sufficiently into conduit 62 so as to block the flow of liquid through passageway portion 200 to the opening 202. As a result, when in this position, liquid can flow through apertures 18 in either direction (recharge or withdrawal) to and/or from passageway portion 198. Also, in the embodiment of the valve assembly of FIGS. 10-12, the valve can be moved to a shut-off position wherein the first valve member 170 overlays and closes the apertures 18 and the second valve member, in this case plug 190, is positioned to close the openings 44 and to also close the passageway 200. As a result, liquid does not flow either through the valve assembly or from the valve assembly to or from the apertures 18.

Desirably in one form, the valve member 170 comprises a tube having an outside diameter which is sized slightly less than the inside diameter of portion 142 of pipe section 10. For example, if pipe section 10 has an inside diameter of six inches, the outside diameter of valve member 170 can be 5 and $^{15}/_{16}$ inches. In addition, valve member 170 can be of a material with some flexibility such that when the valve is positioned to overlie apertures 18, the water pressure within pipe section 10 when installed (the head in the pump column) forces the valve outwardly to provide a good seal or closure of openings 18 against leakage. Because valve member 170 is positioned inside pipe section 10 in this example, the water pressure in the pipe column assists in maintaining the valve in a closed position as water is being pumped from or delivered to the well when valve member 170 is in the closed position. Valve member 170 can be of any suitable material. As a desirable example, valve member 170 can be of a polymer material and can be formed, as by machining or otherwise as a seamless cylinder. In addition, the valve member 170 can be of a variable length, such as from nine inches to one foot long. As a specific example, valve member 170 can have a one-half inch thick wall and be formed of ultra-high molecular weight polyethylene so that it has some resiliency to assist in accomplishing the seal. This material also slides easily against the interior wall surface 142 of the pipe section 10. The valve member 170 is not limited to this specific material. Other examples of suitable valve materials include: Polyvinyl chloride (PVC); HDPE (high density polyethylene); Nylon (Zytel); or any other semi-rigid or resilient material. Multi-material components can also be used.

As an alternative structure, the first valve member 170 can comprise a rigid material with, for example, o-ring or other seals positioned above and below the apertures 18 to seal the apertures when the valve 170 is in the closed position. Although less desirable, the valve 170 can comprise an annular valve positioned exteriorly of the housing wall through which the one or more apertures 18 are provided. The valve 170 can be other than annular (for example arcuate sealing strips that cover columns or rows of apertures when the valve 170 is closed.

Although other configurations of valve member 190 can be used, such as a valve member with a controllable valve shiftable between open and closed positions or an inserted cap shaped valve that has a wall sliding along the exterior of conduit section 62, a simplified desirable form of valve member 190 comprises a plug. As can be seen in FIGS. 10 and 11, plug 190 can be configured to mate with and seal the interior surface of passageway 200 within conduit 62. Consequently, if the passageway 200 is of circular cross-section, plug 190 can be, for example, of right cylindrical construction. The illustrated plug 190 can have a chamfered lower peripheral edge portion 210 to facilitate its movement within passageway 200. In addition, plug 190 can include an axially extending opening through which a distal end portion 212 of a support 180 can extend. The lower most end of projection 212 can be threaded for receiving a fastener, such as a self locking nut 214 with a washer 217 interposed between the nut and lower end of the plug 190, for securing the plug onto the support. In addition, a stop such as a plate 216 of a cross-sectional dimension less than a cross-sectional dimension of the upper end of plug 190 can be secured, as by welding, to the support portion 212. Plate 216 thus provides a backing for the upper end of plug 190 when fastener 216 is tightened. A first or upper ring 220, such as of stainless steel, is positioned to overlay, and in this example abut, the upper end of valve member 170. A similar ring 222 is positioned adjacent to, and in this example abutting, the lower end of valve member 170. Ring 220 can have an inner cross-sectional dimension, such as a diameter that is less than the inner diameter of valve member 170 such that an annular lip 226 extends inwardly into passageway portion 196 at the upper end of the valve member 170. Lip 226 provides a fastening location for a portion of the support 180. Alternative, ring 220 can be provided with projecting mounts for this purpose. Various forms of supports can be utilized to couple valve member 190 to valve member 170 in embodiments where these elements are moved together. One exemplary support 180 comprises a plurality of bracket straps (see FIGS. 3, 9 and 10), such as three such straps 230, 232, 234 spaced 120 degrees apart about the lip 226, that are secured, such as by fasteners or welding to the lip. The bracket straps 230, 232, and 234 converge toward one another and are connected to an upper end portion 238 (FIG. 10) of a support member 212 for valve member 190. Valves 170, 190 can be moved by any appropriate valve actuator between the respective open, closed and (if available in the embodiment) shut-off positions. For example, valve member 170 can be positioned within a support structure such as a cage structure. Single acting or double acting cylinders can be used in an exemplary approach for moving the valve members. Desirably, the valve moving components are of a durable material, with stainless steel being a specific example for many of such components.

Figure 6:
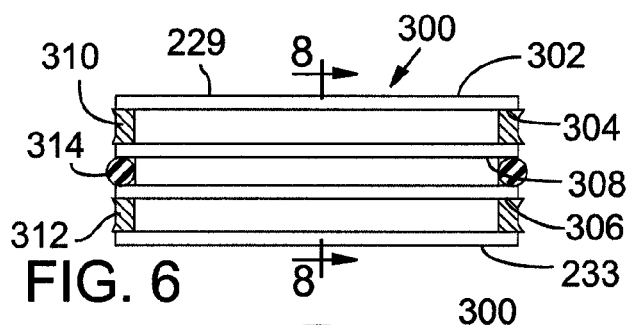
FIG. 6 is a side elevation view, partially in section, of one form of piston that can be used in an actuator for shifting one or more valves of the valve assembly.
Figure 7:
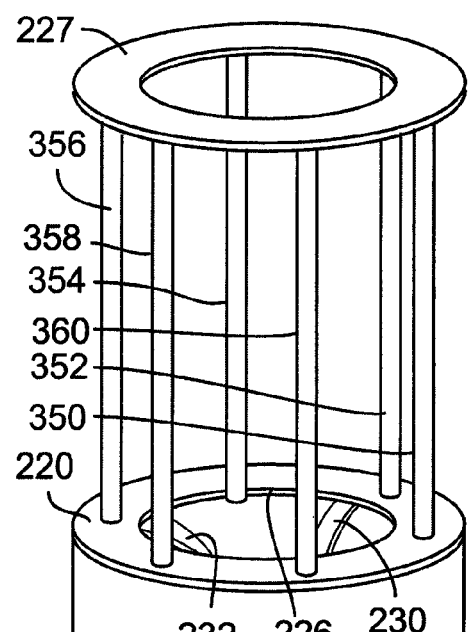
FIG. 7 is a top view of the piston of FIG. 6.
Figure 8:
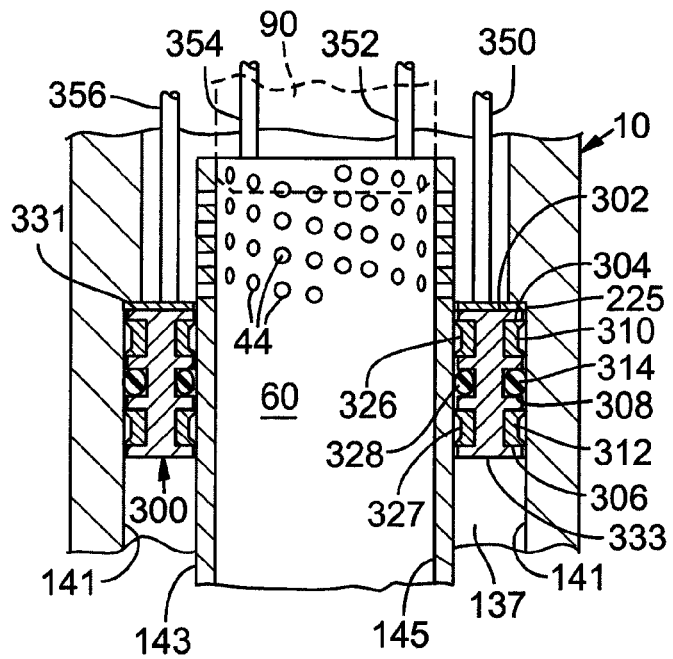
FIG. 8 is a vertical sectional view of a portion of the housing of FIG. 4, with a portion of the conduit of FIG. 5, with the piston of FIG. 6 shown positioned between the housing and conduit, and with a portion of a lower value shown in dashed lines for convenience.

FIGS. 6, 7 and 8 illustrate an exemplary form of an annular piston 300 that can be employed as a valve actuator in the valve assembly 8 of FIGS. 1 and 2. The construction of the piston 300 can be varied. In one form, the valve assembly can comprise a double acting hydraulic cylinder with upper and lower pistons 300', 300 (FIGS. 10, 11). Since these pistons can be identical, although this is not required, only lower piston 300 will be described in detail. With reference to FIG. 6, the illustrated piston 300 comprises an annular body 302. The body 302 defines upper and lower spaced apart wear ring receiving grooves 304,306 extending radially inwardly into the body. In addition, a seal receiving groove 308 is provided intermediate to and spaced from the respective grooves 304 and 306. A first wear ring 310 is positioned within groove 304 and a second wear ring 312 is positioned within groove 306. A seal, such as an o-ring seal 314, is positioned within the groove 308. The wear rings 310, 312 can be of ultra high molecular weight polyethylene or other suitable material, such as of a relatively low friction durable material. The outside diameter of each wear ring 310, 312 is slightly greater than the outside diameter of the body 302 so that, when in position, the wear rings bear against the wall surface 141 (or surface 134 in the case of piston 300 and its wear rings). The o-ring 314 seals the space between the piston 300 and the adjoining wall section 141. The periphery of piston 300 thus defines an exterior annular piston surface for sliding along a portion of wall section 141.

As can best be seen in FIG. 8, the piston body 302 also defines upper and lower inwardly extending interior wear ring receiving grooves that are spaced apart from one another and an inwardly extending interior seal receiving groove between the interior wear ring receiving grooves. Respective wear rings 326, 327 are received in the respective interior wear ring recovery grooves. In addition, at least one seal, such as an o-ring seal 328, is received within the interior seal receiving groove. The o-rings 314, 328 are typically of rubber or other suitable sealing material. The wear rings 326, 327 can be of the same material as wear rings 310, 312. The interior diameter of wear rings 326, 327 is less than the interior diameter of piston body 302 so that the wear rings 326,327, when the piston is in position, slide along the outer surface 143 of conduit section 62 and separate the piston body 302 from the end cap and from the outer surface of conduit 62. The o-ring 328 is sized to seal the gap between end cap wall surface 143 and the piston 300. Other suitable approaches for sealing a piston relative to an interior pipe section wall surface and end cap projection can also be used. Opposed spaced apart major annular piston surfaces, one surface 331 facing valve member 170 and the other surface 333 facing hydraulic chamber 137, are thus included in this exemplary piston construction.

Figure 9:
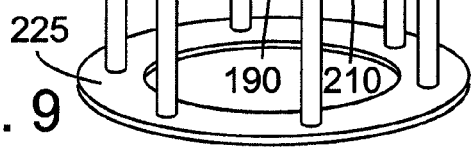
FIG. 9 is a perspective view of one form of valve useable in the valve assembly of FIG. 1.

In FIG. 8, the piston 300 thus corresponds to the lower piston of the valve assembly oriented as shown in FIGS. 10 and 11. The piston surfaces facing valve member 170 (e.g. surface 331 for piston 300), are each coupled to the valve member 170 by a respective pusher or force applying structures, such as a piston to valve engaging structure. In one form (see FIG. 9) plural push rods, which can be of stainless steel or other suitable material, comprise a form of piston to valve engaging structure. In this example, six push rods 350, 352, 354, 356, 358, 360 are shown. Although these rods can of plural piece construction, in the form shown in FIGS. 9, 10 and 11, the rods project upwardly and downwardly from the respective rings 220, 222 and extend through the rings and valve member. The push rods are also desirably fastened to the rings 220, 222, such as by welds (one being numbered as 340 in FIG. 10). The ends of the push rods are desirably fastened, such as by welding, to respective rings or other bearing surface members that engage the respective pistons. As shown in FIG. 9, the lower ends of these push rods desirably engage and are fastened, such as by welding, to the upper surface 331 of a ring 225 that engages the upper surface of the piston 300. In addition, the upper ends of the push rods desirably engage and are fastened, such as by welding, to the lower surface of a ring 227 that engages the lower surface of a piston 300' (see FIG. 10). FIG. 9 thus shows an exemplary push rod to valve subassembly. Although a set of six push rods are shown in FIG. 9 in position projecting from each end of valve member 170, the number of push rods can be varied. In the embodiment of FIG. 9, the push rods are spaced equally about the circumference of a right cylindrical valve member 170. In the case of a valve assembly for use with eight inch well pipe, six or more push rods is a desirable exemplary number. For a valve assembly for ten inch well pipe, eight or more push rods is a desirable number. Each of the ends of the push rods and associated rings 225, 227 desirably comprises respective piston bearing surfaces. The surfaces of rings 225, 227 each bear against the corresponding adjacent major surface of a respective one of the pistons during operation of the valve assembly. The outer diameters of rings 220, 222, 225, 227 are desirably slightly less than (e.g. $\frac{1}{32}$ of an inch less than) the diameter of the valve member 170 so that the edges of these rings do not engage the adjacent sidewall of the pipe section. The ring members 220, 222 provide an increased surface area that bears against the adjacent end of the valve member 170. Consequently, with this exemplary construction, the valve actuation forces are primarily borne by the push rods rather than being applied directly to the valve sleeve. This minimizes the possibility of the valve member 170 buckling or being crushed or damaged if, for example, one of the pistons 300, 300' were to seize for some unlikely reason.

Figure 13:
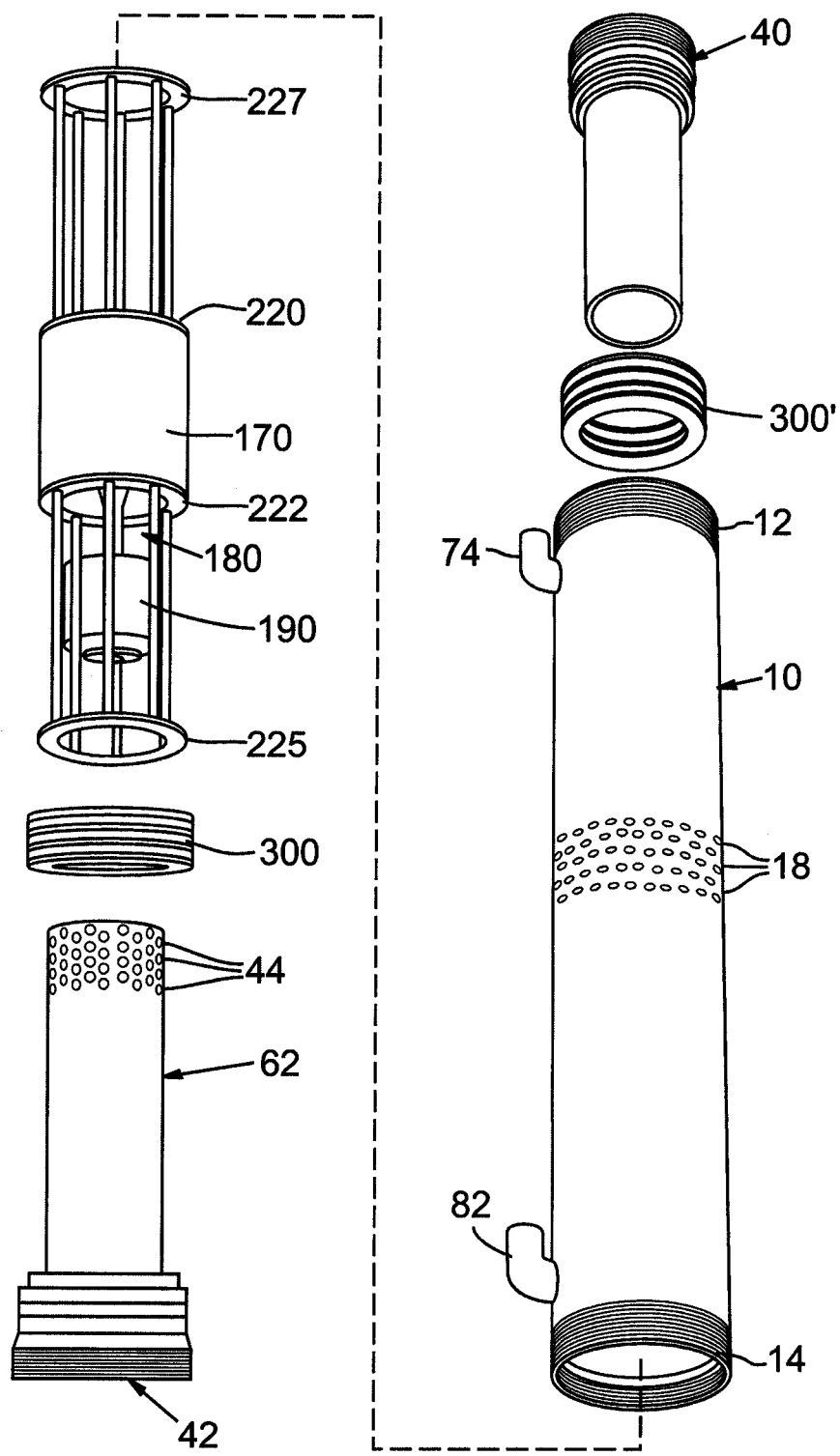
FIG. 13 is an exploded view of one embodiment of a valve assembly in accordance with the disclosure.

For purposes of further illustration, FIG. 13 has been included to show an exploded view of a valve assembly embodiment. The same numbers have been used in FIG. 13 for elements in common with those shown in FIG. 10.

Figure 14:
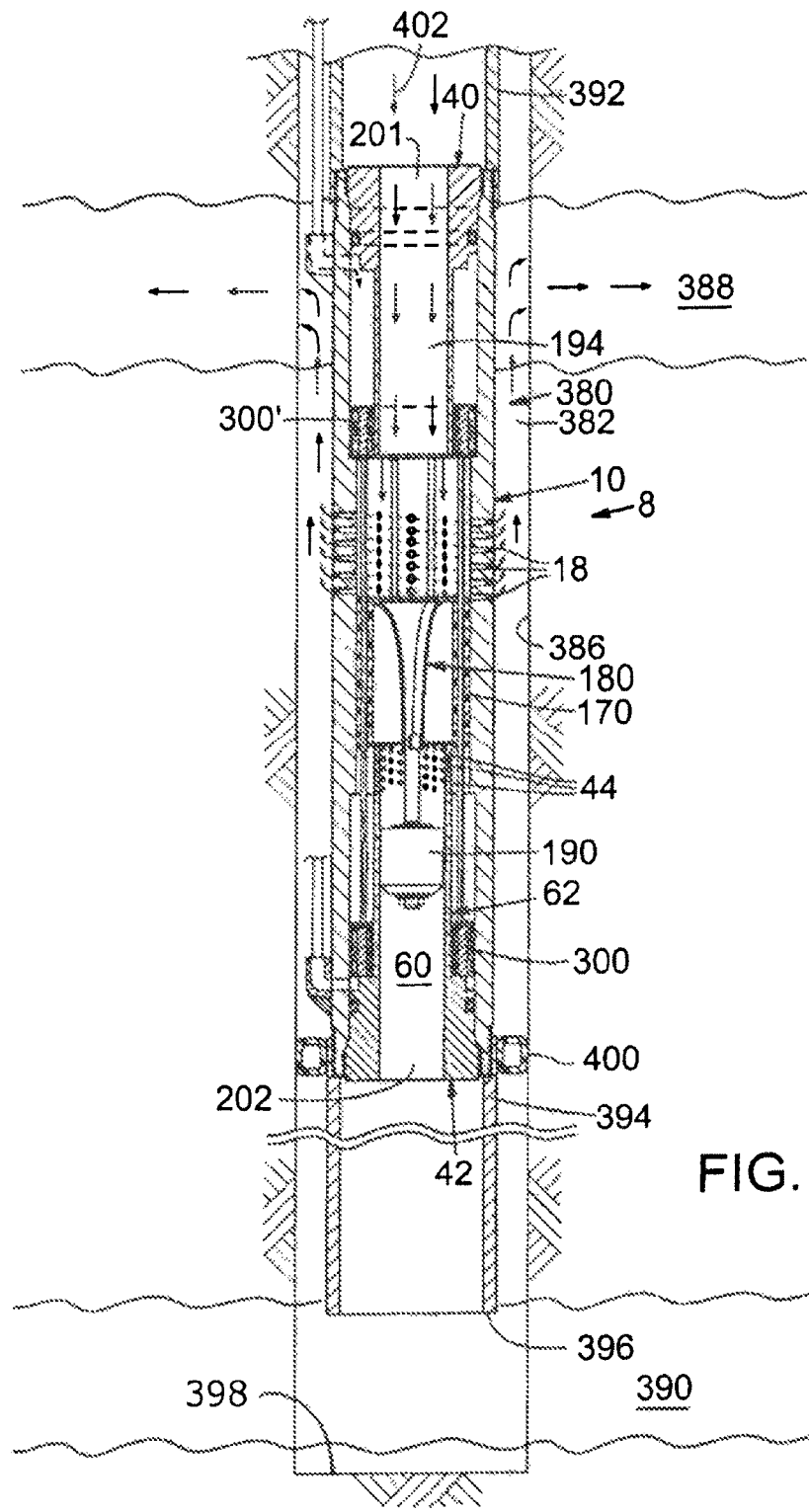
FIG. 14 is similar to FIG. 10 and illustrates the flow of liquid through housing apertures of the valve assembly with the conduit section blocked and also showing packing positioned at one location in a well bore to isolate an upper aquifer into which liquid is shown flowing in FIG. 14 from a lower aquifer to which no liquid flows when the first and second valves are in the position shown in FIG. 14.

FIG. 14 illustrates a well 380 comprising a bore hole 386 which has been drilled, such as from the surface through a first aquifer 388 and through (or into) a second aquifer 390. A well casing has been included in the well and comprises a plurality of pipe segments or sections, including one or more upper pipe sections. Typically a number of such upper pipe sections are included, with one such upper pipe section 392 being shown with its lower end portion connected to the upper end portion of pipe section 10 of valve assembly 8. In addition, the well casing includes one or more lower pipe sections, and typically a plurality of such lower pipe sections, with one such lower pipe section 394 shown with its upper end connected to the lower end of pipe section 10. The lower most portion of the well casing is shown terminating in a pipe section with an end 396 spaced above the bottom 398 of the bore hole. Note, the distance between the end 396 of the lower well casing and bore hole 398 is compressed in FIG. 14, and is typically of a substantial length. Conventional packing 400, which is typically inflatable after insertion, is shown positioned between the well casing and the bore hole. The packing can be located at any desired location within the bore hole below apertures 18 in this example, and at a location between aquifers 388, 390, such that liquid is blocked from flowing or traveling between the casing and bore hole wall between these aquifers except as may be permitted by the valve assembly or an alternative form of the valve assembly.

When valve assembly 8 is shifted to the position shown by an embodiment in FIG. 14, apertures 18 are no longer entirely overlaid by valve member 170, and thus valve member 170 is in an open position. Conversely, in the position shown in FIG. 14, the valve member 190 is in a closed position and prevents the flow of liquid from one end 201 or 202 of the valve assembly to the other end 201 or 202 of the valve assembly. Consequently liquid indicated by arrows 402 in FIG. 14 that is being pumped into the well casing flows downwardly into the valve assembly (as shown by these arrows), outwardly through apertures 18, upwardly between the well casing and bore hole to and into the upper aquifer 388. With the valve assembly in this state, and if water is being pumped from the well, water would flow from aquifer 388 along this flow path to the well casing and to the surface.

Figure 15:
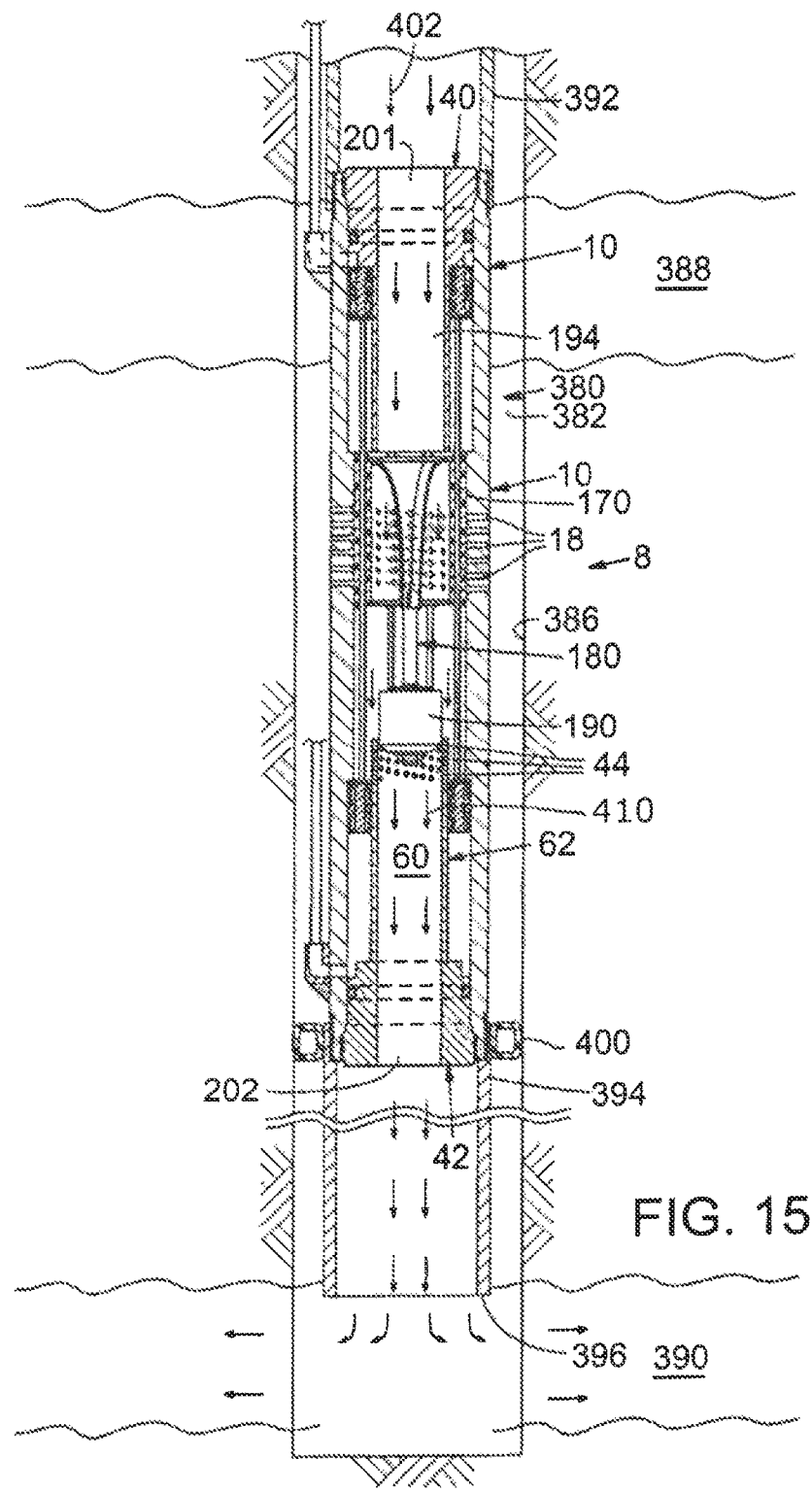
FIG. 15 is similar to FIG. 14 except that the housing apertures are shown blocked to prevent liquid flow into the upper aquifer while liquid flow into the conduit section and to the lower aquifer is permitted.

In FIG. 15, valve member 170 is shown in a closed position overlying the apertures 18. In contrast valve member 190 is in an open position such that apertures 44 provide a bypass passageway permitting the flow of liquid (such as water indicated by arrows 410) through the valve assembly from the exterior of conduit 62, through apertures 44, to the interior of conduit 62 and to or from the lower casing section where the liquid can be delivered to the lower aquifer 390.

Figure 16:
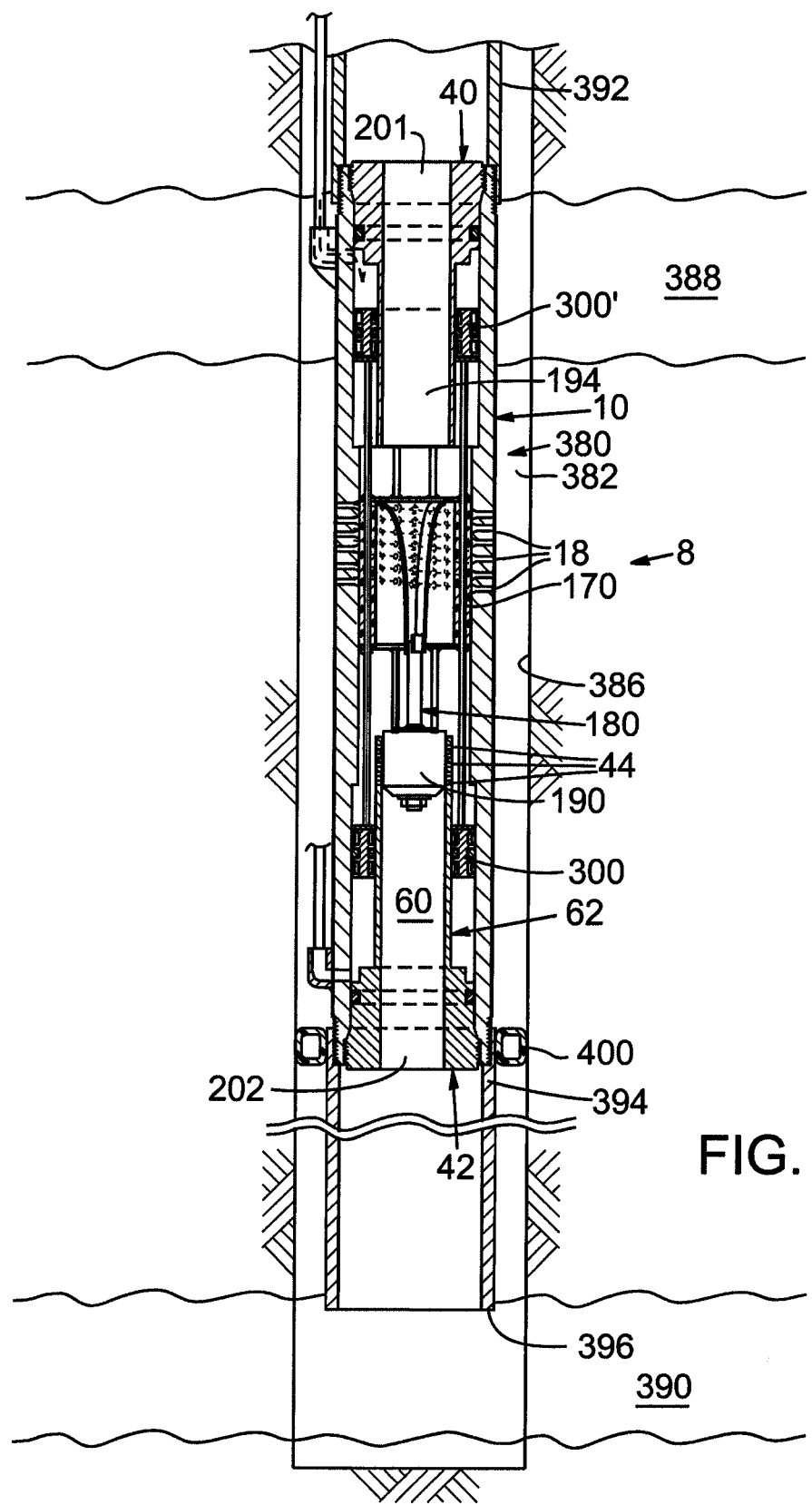
FIG. 16 is similar to FIG. 15 except that fluid flow is blocked through both the housing apertures and conduit section.

In the embodiment of FIG. 16, the illustrated valve assembly can be shifted to a shut-off position wherein the first valve member 170 overlies and closes the apertures 18 and the second valve member or plug 190 closes the apertures 44 and the interior passageway through the conduit section 62. As a result, liquid cannot flow to or from apertures 18 or through the conduit to or from the lower section of the well casing.

Figure 17:
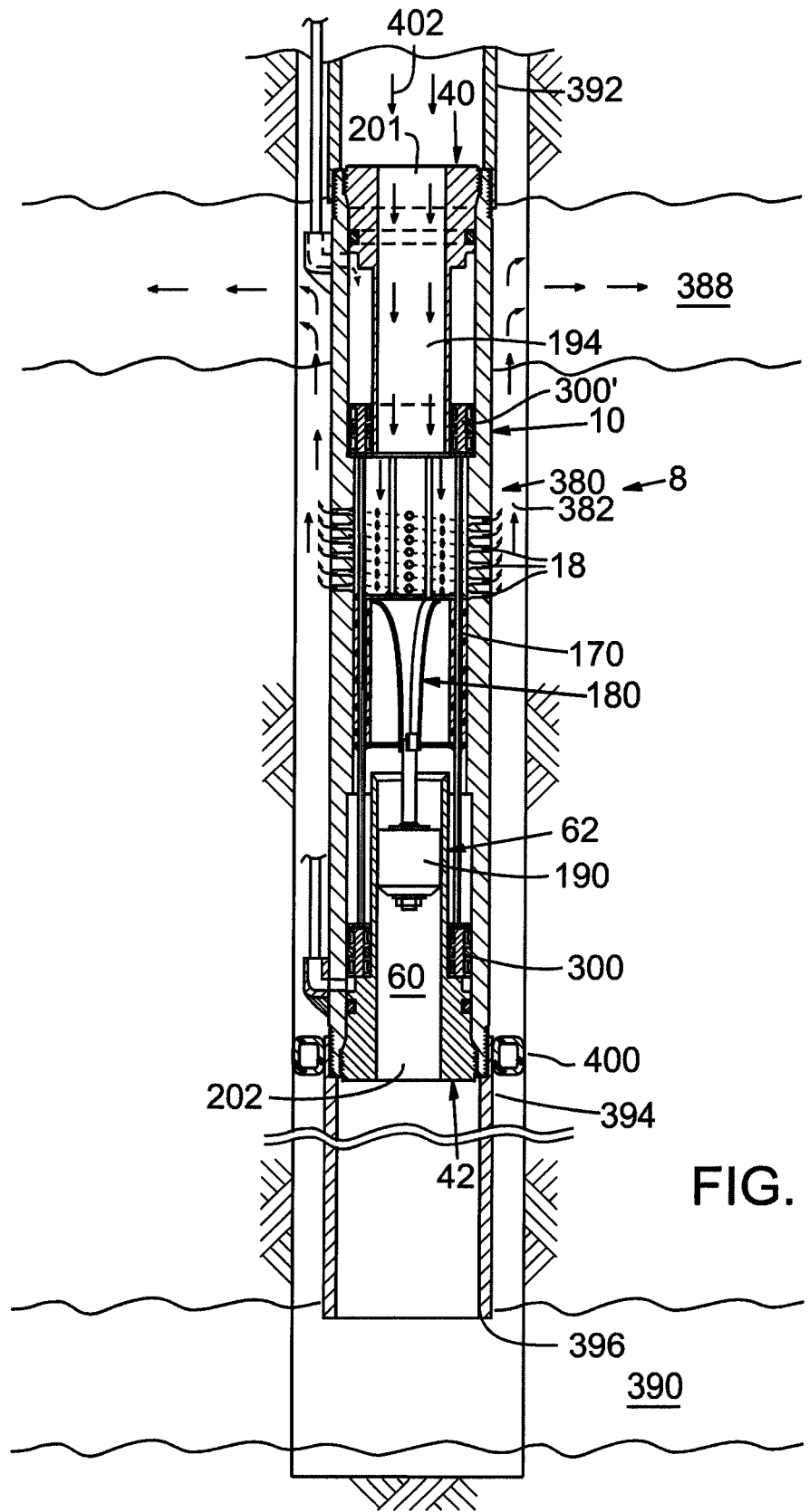
FIGS. 17-19 are like FIGS. 14-16 except that the bypass apertures in an upper portion of the conduit section have been eliminated to provide an alternative form of bypass passageway around or past a second valve (see FIG. 18) when the second valve is in an open position.
Figure 18:
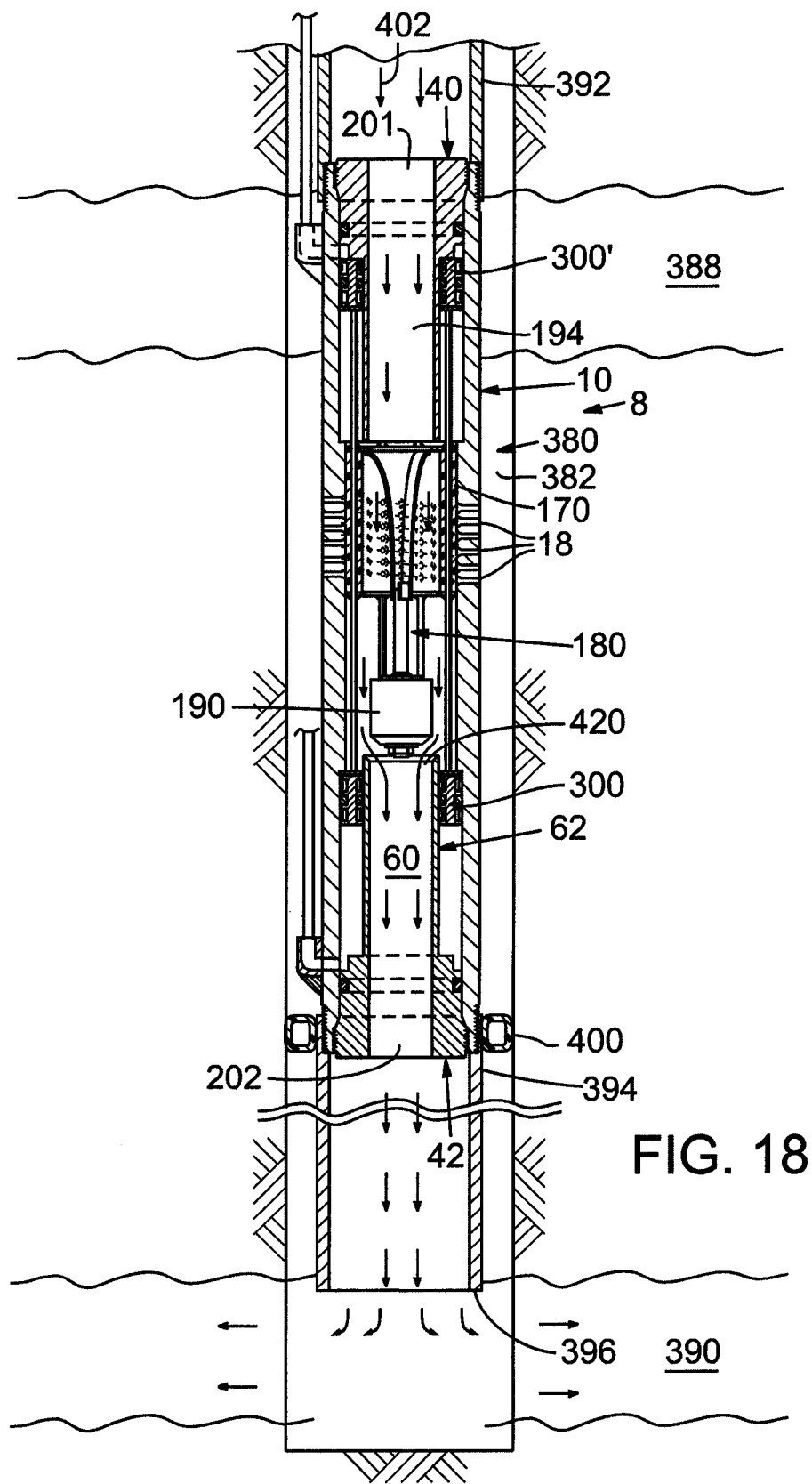
Figure 19:
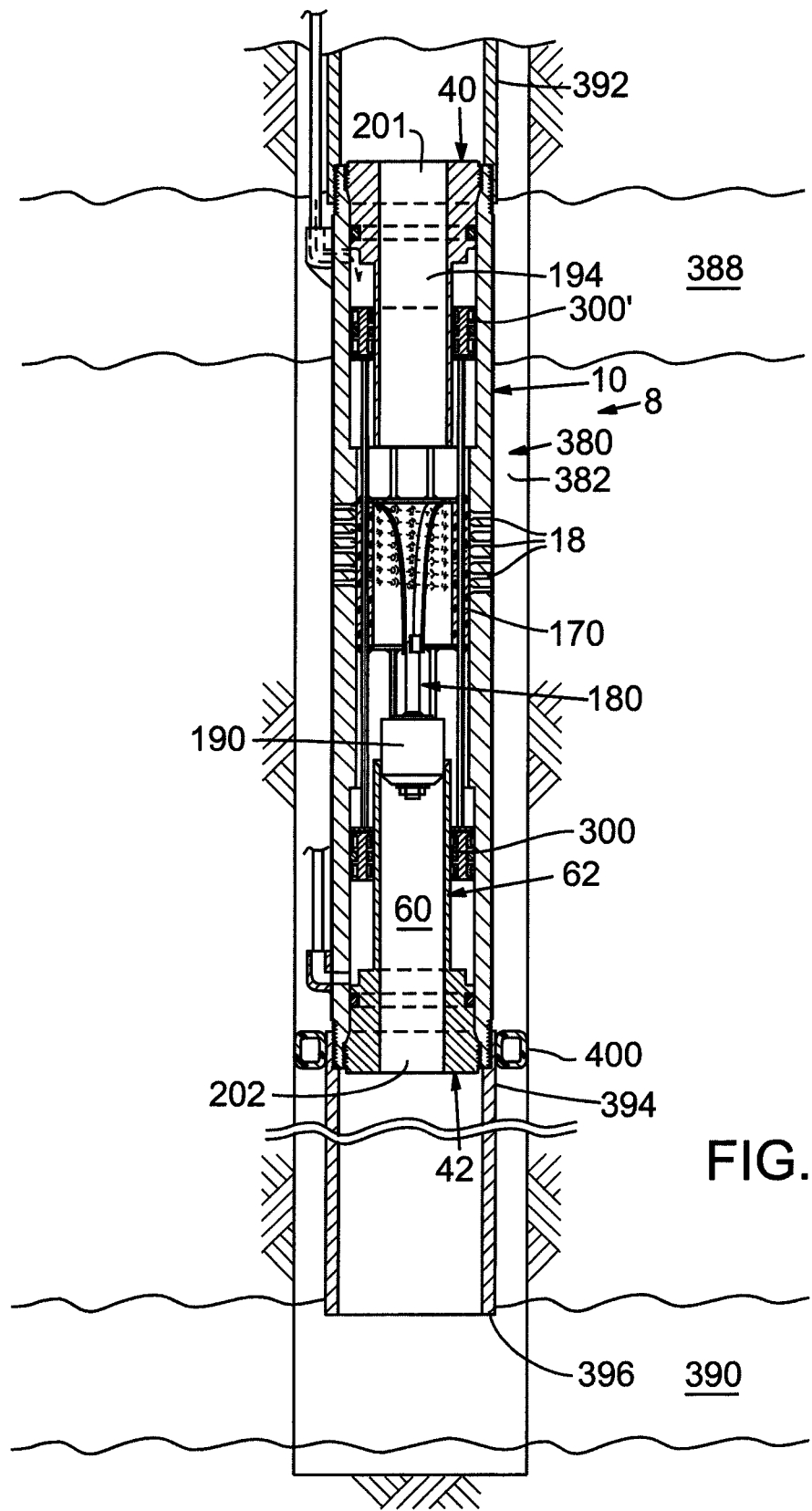

FIGS. 17 through 19 illustrate an alternative embodiment of valve assembly 8. FIGS. 17 through 19 correspond to FIGS. 14 through 16. In the embodiment of FIGS. 17 through 19, the apertures 44 in conduit 62 have been eliminated. In FIG. 17, valve member 170 is shown in an open position with valve member 190 shown inserted sufficiently into conduit section 62 to close the conduit section against the flow of liquid therethrough. In FIG. 18, valve member 170 has been shifted to a position overlying the apertures 18 to close off the flow of liquid through the apertures. In addition, valve member 190 has been shifted upwardly sufficiently to provide a bypass passageway around the valve member to the upper end of the conduit 62. The upper end of conduit 62 is chamfered at 420 to facilitate the insertion and removal of valve member 190 into the conduit 62. FIG. 19 illustrates valve member 170 and valve member 190 that are both positioned in a closed position. As is apparent from FIGS. 14 through 19, with valve member 170 coupled to valve member 190, in this case connected indirectly to valve member 170 by support 180, the valve members 170, 190 are moved together to their respective valve positions. In addition, the valve open, closed, and shut-off positions for valve member 170 differ from one another. Also, the valve open, closed, and shut-off positions for the valve member 190 also differ from one another.

Figure 20:
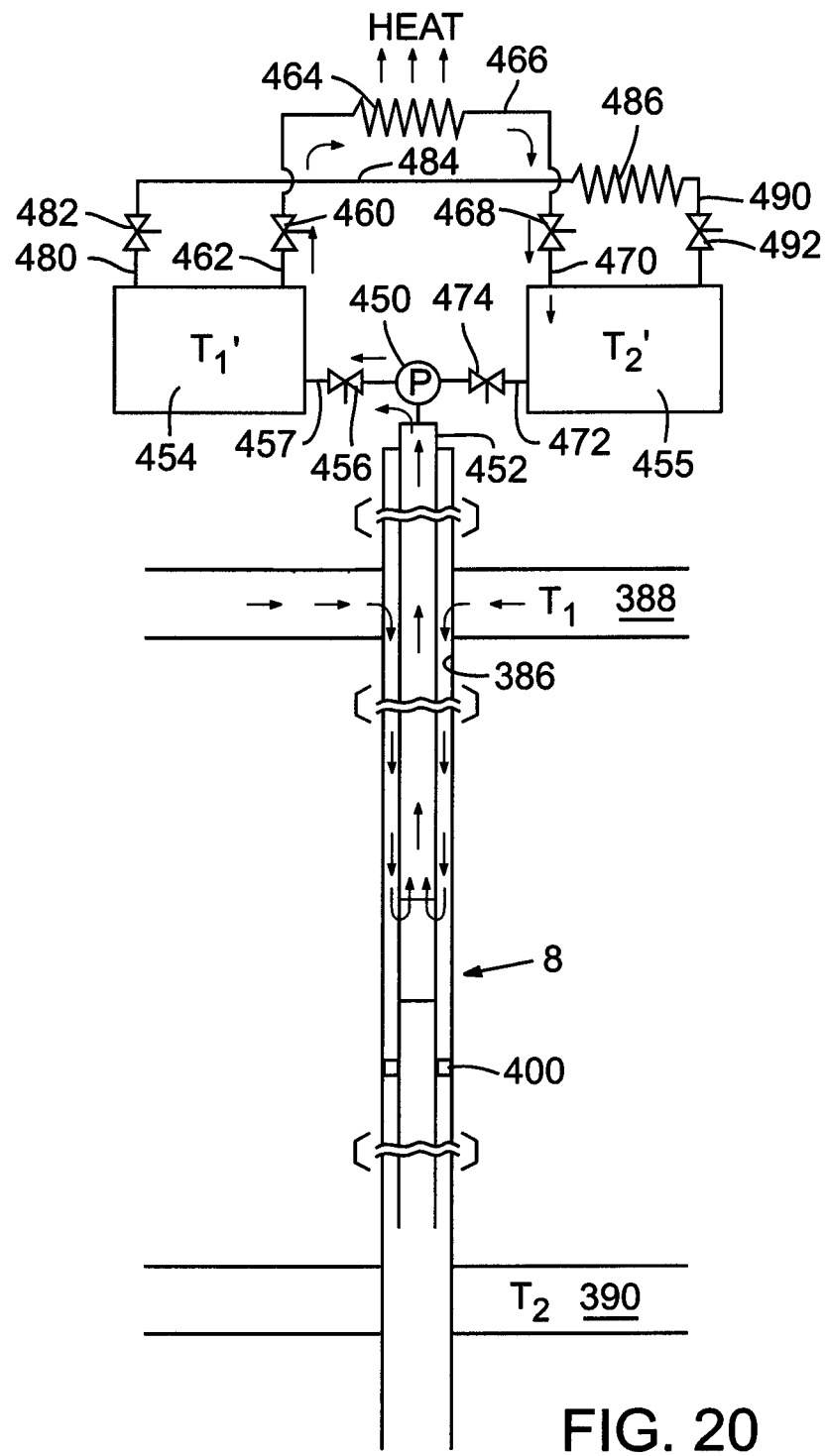
FIGS. 20-23 illustrate an application of an embodiment of a valve assembly in accordance with this disclosure to deliver liquid of a first relative temperature to or from a first aquifer and liquid of a second relative temperature to or from a different aquifer.
Figure 21:
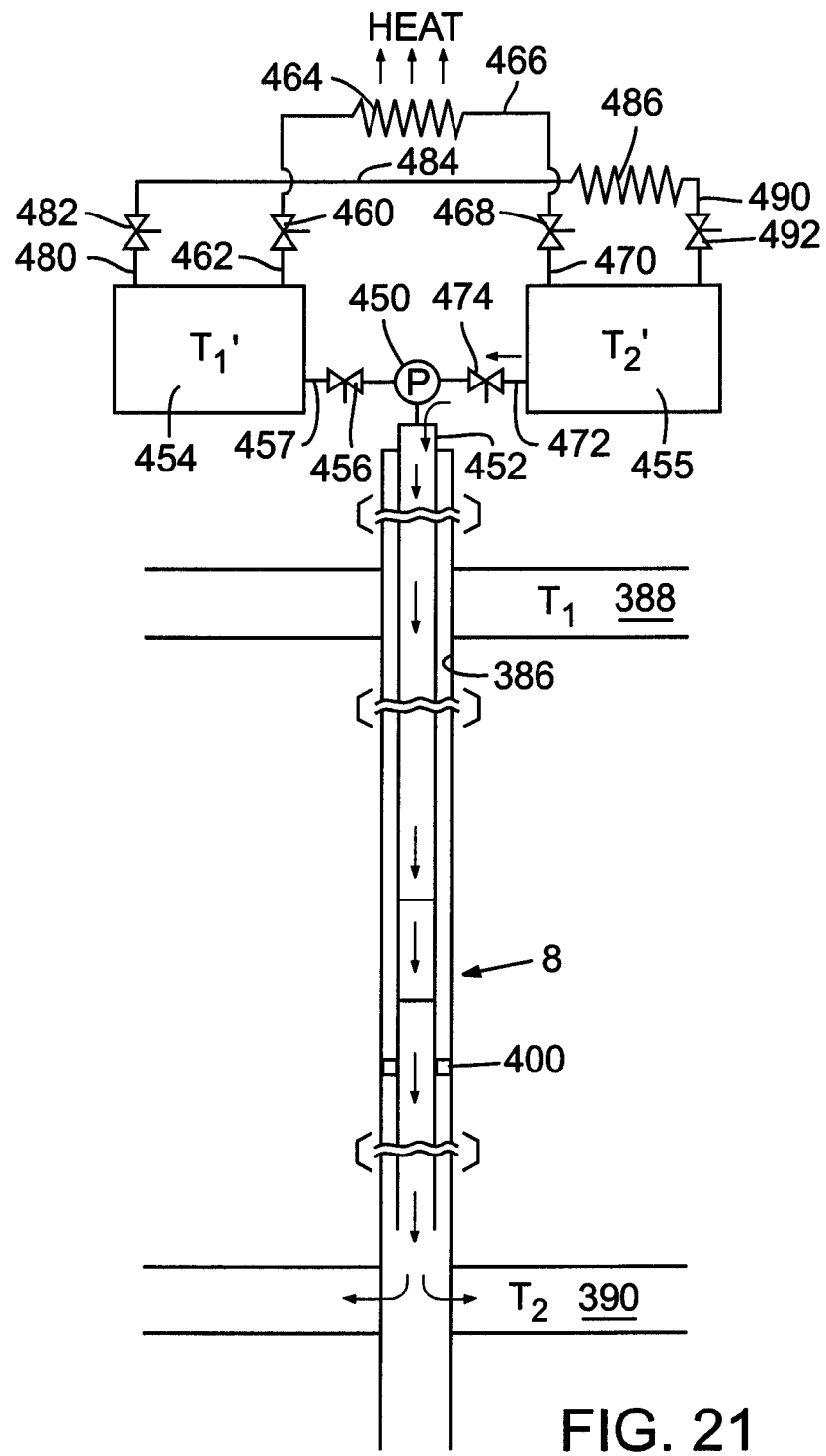

FIGS. 20 through 23 illustrate an exemplary application of valve assembly 8. Numbers for elements in common with elements shown in FIGS. 14-16 have been retained in these figures. In FIG. 20, assume the valve assembly 8 is to be used in an application wherein water is to be drawn from one aquifer (e.g. aquifer 388) for use in heating a building or other environmental space. In this example, a pump 450 is shown for pumping water to or from the well casing 452. More than one pump can be used, but one is shown for convenience. First and second liquid storage tanks 454, 455 are shown in this figure, although more such tanks can be used. A valve 456 is shown in a flow path 457 from pump 450 to tank 454. A valve 460 is shown in a flow path 462 from tank 454 to a heat exchanger 464 in a flow path 466 that passes through a valve 468 and a flow path 470 to the tank 455. The tank 455 is coupled by a flow path 472 through a valve 474 and to the pump 450. In addition, tank 454 is coupled via a flow path 480 through a valve 482 and a flow path 484 through a heat exchanger 486 to a flow path 490 and through a valve 492 to the tank 455. These valves can be remote controlled valves, such as solenoid valves responsive to a control signal to shift between open and closed positions. Again, this is an exemplary construction as more or fewer heat exchangers and flow paths can be utilized.

Assume that heat is to be extracted from water in aquifer 388. In this example, valve assembly 8 is operated to provide a flow path from aquifer 388, through the bore outside of the well casing to apertures 18 of the valve assembly. From there, the water flows through apertures 18 and upwardly through the interior of the casing where it is pumped by pump 450 through valve 456, which is now open, and into tank 454. The water is then delivered through flow path 462 and now open valve 460 to heat exchanger 464 which extracts heat from the water. Water (now cooler due to the heat extraction) then passes through flow path 466, through now open valve 468, and via flow path 470 and into tank 455. Thus, water at temperature T1 from aquifer 388 is delivered to tank 454, indicated at temperature T1' in tank 454 due to some change in temperature as the water travels along this partial flow path and is stored in tank 454. Following extraction of heat from the water, the water delivered to tank 455 is at T2' which is at a relatively low temperature compared to the temperature at T1' and T1. Tanks 454 and 455 can be sized large enough to accumulate significant quantities of water. From time to time, such as periodically or when heating is no longer required, or as otherwise controlled, valve assembly 8 can be shifted to the state shown in FIG. 21. When in this state or condition, apertures 18 are closed and a flow path is provided through the valve assembly to the lower aquifer 390. Pump 450 can deliver water from tank 455 through a now open valve 474 and flow path 472 (valve 456 being closed) back to the interior of the well casing. The water then flows downwardly through the well and valve assembly 8 to the aquifer 390. This relatively cold water at temperature T2 is thus being stored in the second aquifer.

Figure 22:
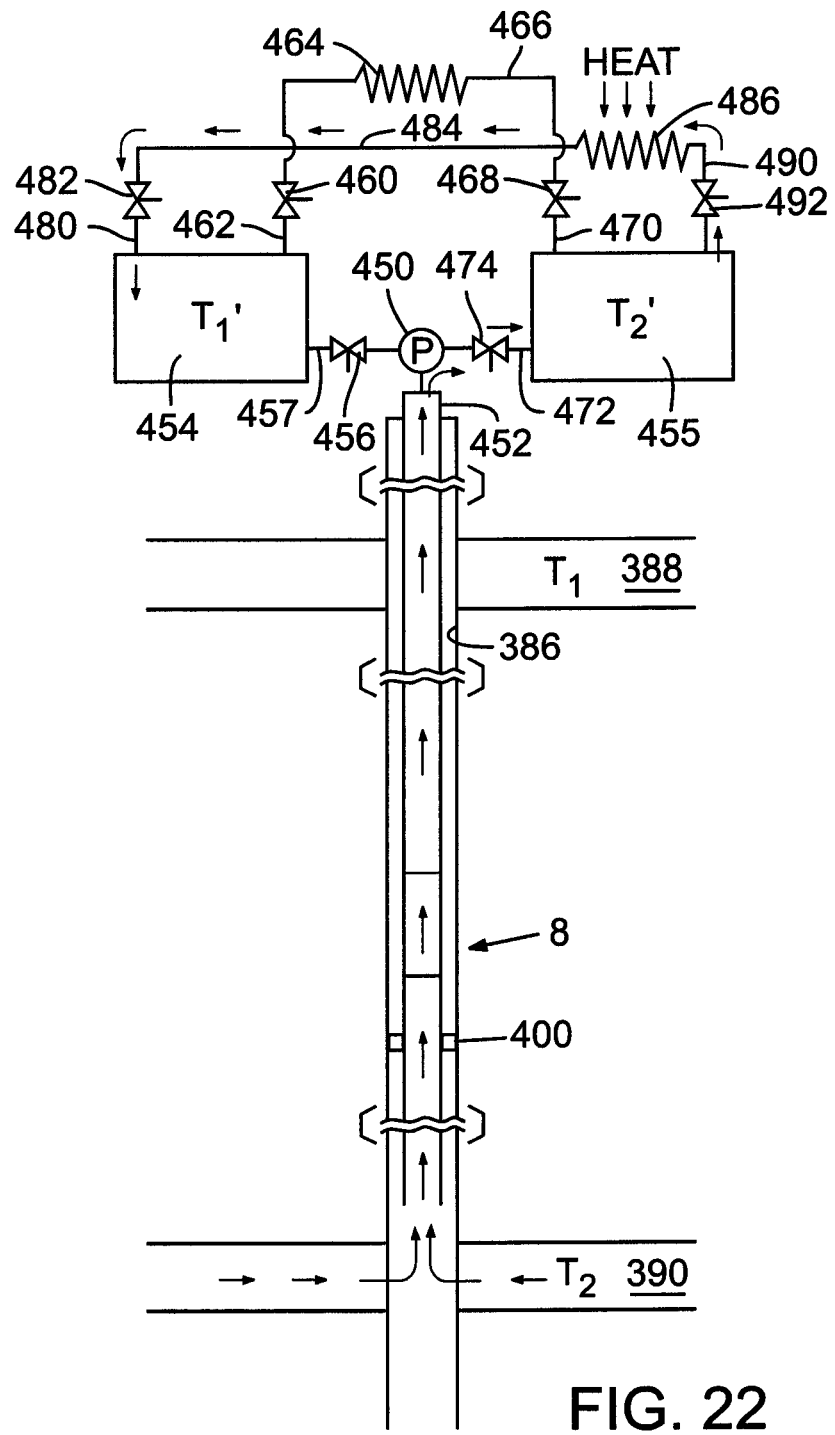

With reference to FIG. 22, assume that water from the well is to be used for cooling purposes. In this case, valve assembly 8 can be shifted to a condition wherein apertures 18 are closed and the flow path through the valve assembly is open. As a result, pump 450 can draw water of relatively cold temperature T2 from aquifer 390 to the surface. This assumes that tank 455 is still the relatively low temperature tank and that tank 454 is the relatively high temperature tank. In this case, water can pass from pump 450, through now open valve 474 (with valve 456 being closed), and through flow path 472 to the tank 455. From tank 455, water can be drawn through now open valve 492 and flow path 490 to heat exchanger 486 wherein the relatively cool water is used to extract heat from the room or other environment to be cooled. The water warmed by this cooling process is then delivered via flow path 484 through now open valve 482 to the tank 454. Again, the temperature of the water in tank 454 is relatively high compared to the temperature of water in tank 452 as heat has been added to the water by heat exchanger 486 during the cooling of the environmental space. When operated in this manner, valve 456, 460 and 468 of the illustrated system are typically closed. Alternatively, the pump 450 can direct water in the same direction as shown in FIG. 20 with valve 482 being open to provide access to heat exchanger 486, although this is less desirable.

Figure 23:
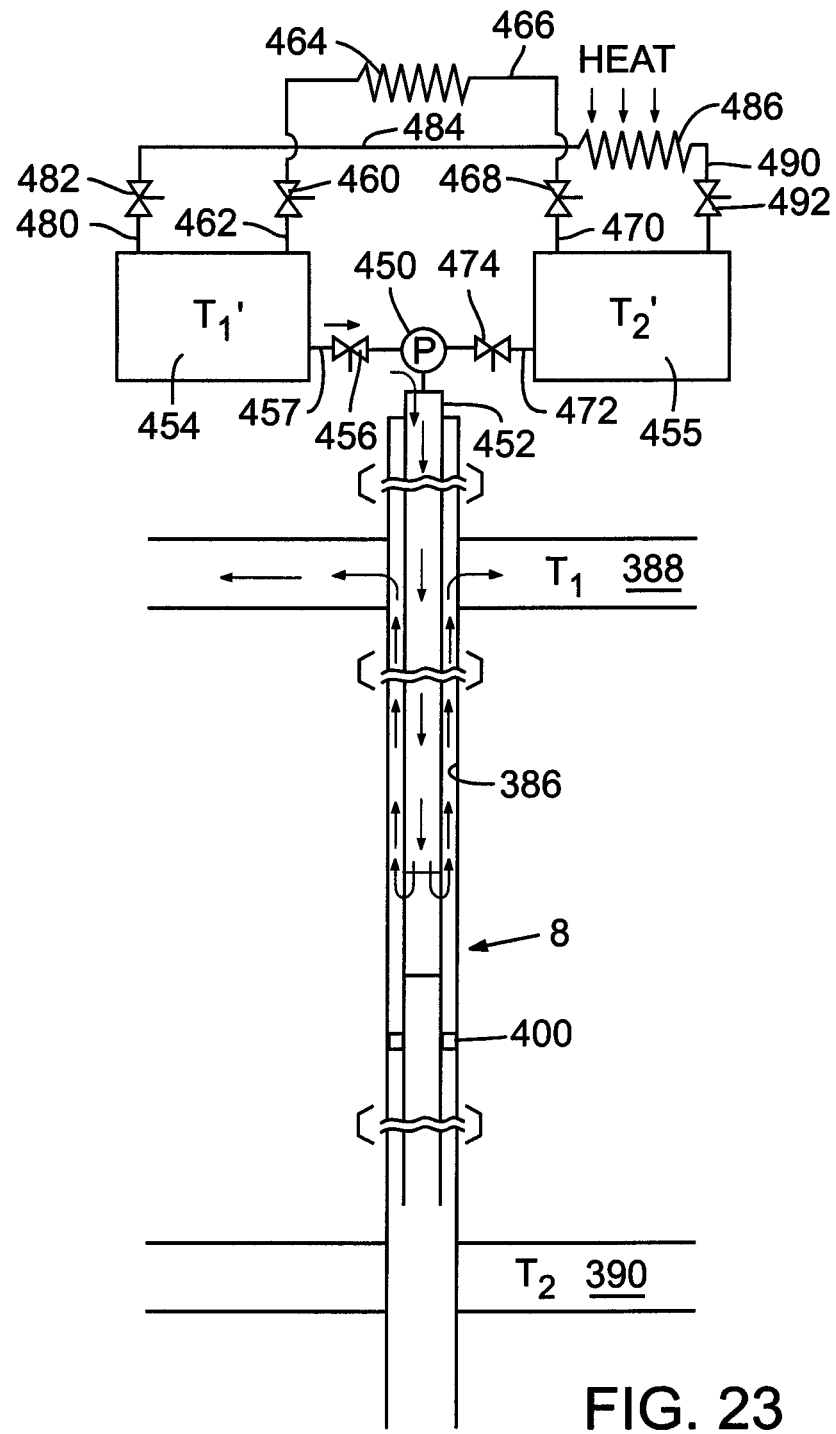

With reference to FIG. 23, from time to time, periodically, or under other control, such as manual control, the water warmed during cooling of the environmental space can be returned from tank 454 to the well. In this example, because energy from warm water is desirably stored in aquifer 388 for subsequent use in heating the environmental space, valve assembly 8 can be operated as shown in FIG. 23 to provide a flow path through apertures 18, with the flow path through the valve assembly to aquifer 390 being blocked. Thus, under these conditions, water flows from tank 454 through flow path 457 and now open valve 456 (valve 474 being closed) and into the well casing. Water flows downwardly into the valve assembly 8, through apertures 18, and along the exterior of the well casing to the aquifer 388 where the now warmed water is stored for subsequent use in a heating application.

Whether the temperature of water will actually change in an aquifer depends in part on the volume of usage therefrom and storage therein. Regardless, relatively high temperature water can be taken from one aquifer and returned to a different aquifer. In addition, relative low temperature water can be taken from another aquifer and returned to a different aquifer. In addition, it is possible to take and return the liquid to the same aquifer and to select the aquifer to be used from plural aquifers.

In view of the many possible embodiments to which the principles of the disclosed invention may be applied, it should be recognized that the illustrated embodiments are only desirable examples of the invention and should not be taken as limiting the scope of the invention. Rather, the scope of the invention is defined by the following claims. I therefore claim as my invention all modifications that fall within the scope and spirit of these claims.

I claim:

1. A valve assembly for use in selectively delivering recharge liquid through one portion of the valve assembly to an aquifer or receiving liquid from an aquifer through the one portion of the valve assembly and selectively delivering recharge liquid through another portion of the valve assembly to an aquifer or receiving liquid from the aquifer through said another portion of the valve assembly, the valve assembly comprising:

a pipe section comprising a wall with an interior surface and an exterior surface and a liquid flow passageway through the pipe section;

at least one aperture extending through the wall at said one portion of the valve assembly and communicating between a first portion of the liquid flow passageway and the exterior of the pipe section;

at least one bypass passageway communicating from the first portion of the liquid flow passageway to a second portion of the liquid flow passageway;

a first valve positioned within the interior of the pipe section and selectively movable from a first valve closed position in which the first valve overlies and blocks liquid flow through the at least one aperture to a first valve open position in which the first valve no longer overlies the at least one aperture at least in part such that liquid can flow through the at least one aperture to recharge the at least one aquifer or recover liquid from at least one aquifer when the valve assembly is installed in a well casing, wherein the first valve has flexibility such that when the first valve is in the first valve closed position and the valve assembly is installed in a well casing, a head of water pressure within the pipe section can urge the valve outwardly against the overlaid at least one aperture;

a second valve positioned within the interior of the pipe section and selectively movable from a second valve open position to a second valve closed position, wherein in the second valve open position the second valve is positioned to at least partially open the bypass passageway such that liquid can flow through the pipe section through the first portion of the liquid flow passageway, through the bypass passageway and through the second portion of the liquid flow passageway, and wherein in the second valve closed position the second valve closes the second portion of the liquid flow passageway to thereby block liquid flow through the liquid flow passageway;

a valve actuator coupled to the first valve and operable to selectively move the first valve between the first valve closed position and first valve open position, the valve actuator also being coupled to the second valve and operable to selectively move the second valve between the second valve open position and the second valve closed position, the second valve being selectively movable to the second valve open position at least during a portion of the time that the first valve is in the first valve closed position such that liquid can flow through the first portion of the liquid flow passageway, the bypass passageway and the second portion of the liquid flow passageway through the said another portion of the valve assembly to or from at least one aquifer to recharge the at least one aquifer or to recover liquid from said at least one aquifer when the valve assembly is installed in a well casing without flowing through the at least one aperture; and the valve actuator being operable to selectively move the second valve to the second valve closed position during at least a portion of the time the first valve is in the first valve open position such that when the valve assembly is installed in a well casing the second valve blocks liquid flow through the second portion of the liquid flow passageway to or from an aquifer and liquid is allowed to flow through the at least one aperture to or from an aquifer; and wherein the first valve comprises a hollow cylindrical valve having an interior wall with an inner wall diameter and first and second end portions, the cylindrical valve having a valve center portion spaced inwardly from the interior wall through which liquid can flow, a first ring adjacent to the first end portion and a second ring adjacent to the second end portion, the first ring having an inner ring diameter that is less than the inner wall diameter, the first ring being positioned adjacent to the first end portion such that an interior periphery portion of the first ring extends inwardly of the interior wall, a support comprising a first support portion mounted to the interior periphery portion of the first ring and extending away from the first ring and toward the center portion of the cylindrical valve, the first support portion extending through the interior of the first valve and terminating in a second distal end support portion, the second distal end support portion comprising a valve supporting stem portion extending away from the first ring and first support portion and beyond the second end portion of the cylindrical valve, the valve support being configured to allow liquid to flow through the cylindrical valve and first portion of the valve support within the interior of the cylindrical valve, and the second valve being mounted to the distal end of the support.

2. A valve assembly according to claim 1 wherein the valve actuator is slidably coupled to the interior of the pipe section and slidable to selectively move the first valve to a first valve shut off position in which the first valve overlies and blocks the flow of liquid through the at least one aperture, wherein the second valve is selectively movable to a second valve shut off position in which the second valve closes the bypass passageway and blocks the flow of liquid flow through the second portion of the liquid flow passageway, the valve actuator being slidable to selectively move the second valve to the second valve shut off position during at least a portion of the time the first valve is in the first valve shut off position such that when the valve is installed in a well casing the second valve blocks liquid flow through the bypass passageway and through the second portion of the liquid flow passageway to an aquifer and the first valve blocks the flow of liquid through the at least one aperture to an aquifer.

3. A valve assembly according to claim 2 wherein the first valve closed position and the first valve shut off position are at different first valve positions in the pipe section from one another, and wherein the second valve closed position and the second valve shut off position are at different positions from one another in the pipe section.

4. A valve assembly according to claim 1 wherein the second valve is coupled to the first valve for movement with the movement of the first valve and the valve actuator comprises a common slidable actuator for moving both the first and second valves simultaneously.

5. A valve assembly according to claim 1 wherein the first valve comprises an annular valve body comprising a polymer material with a valve exterior surface and a valve interior surface, the valve body allowing liquid to flow through the valve body and through the first portion of the liquid flow passageway, the first valve being movable between the first valve closed position in which the valve exterior surface of the valve body overlies a portion of the interior surface of the wall and entirely overlies the at least one aperture and the first valve open position in which the valve exterior surface of the valve body no longer entirely overlies the at least one aperture, and wherein the second valve comprises a plug, and wherein the pipe section has a longitudinal axis and wherein the bypass passageway has a section that is open along the longitudinal axis of the pipe section.

6. A valve assembly according to claim 5 comprising a conduit section coupled to the pipe section and comprising a first conduit end portion and a second conduit end portion with at least a portion of the second portion of the liquid flow passageway communicating between the first and second conduit end portions, the conduit section also comprising a conduit wall with an interior surface and an exterior surface, the bypass passageway comprising at least one conduit bypass aperture through the conduit wall and communicating between the first portion of the liquid flow passageway and the second portion of the liquid flow passageway, the plug being selectively movable from the second valve open position wherein the plug blocks the first conduit end portion while permitting the flow of liquid through the first portion of the liquid flow passageway, the at least one conduit bypass aperture and the second portion of the liquid flow passageway and thereby through the pipe section at least during a portion of the time that the first valve is in the first valve closed position to entirely block the at least one aperture, the plug being movable to the second valve closed position wherein the plug is positioned to block liquid flow through the second portion of the liquid flow passageway and to block the flow of liquid through the conduit bypass aperture at least during a portion of the time that the first valve is in the first valve open position such that liquid can flow through the at least one aperture between the interior and exterior of the pipe section.

7. A valve assembly according to claim 6 wherein the first valve is selectively movable to a first valve shut off position in which the exterior surface of the valve body overlies a portion of the interior surface of the wall and entirely overlies the at least one aperture to block the flow of liquid through the at least one aperture, wherein the plug is selectively movable to a second valve shut off position in which the plug blocks the flow of liquid through the second portion of the liquid flow passageway at least during a portion of the time that the first valve is in the first valve shut off position to thereby prevent the flow of liquid both through the liquid flow passageway and through the at least one aperture.

8. A valve assembly according to claim 5 comprising a conduit section coupled to the pipe section and comprising a first conduit end portion and a second conduit end portion with at least a portion of the second portion of the liquid flow passageway communicating between the first and second conduit end portions, the conduit section also comprising a conduit wall with an interior surface and an exterior surface, the bypass passageway comprising a liquid flow path past the plug and into the first conduit end portion at least when the plug is positioned outside of the conduit section, the plug being selectively movable to the second valve open position wherein the plug is positioned exteriorly of the conduit section such that liquid can flow past the plug and into the first end portion of the conduit section at least during a portion of the time that the first valve is in the first valve closed position and entirely blocks the at least one aperture, the plug being movable to the second valve closed position wherein the plug is inserted at least partially into the first end portion of the conduit section to block liquid flow through the bypass passageway and through the conduit section and thereby through the second portion of the liquid flow passageway at least during a portion of the time that the first valve is in the first valve open position and no longer entirely overlays the at least one aperture such that liquid can flow through the at least one aperture between the interior and exterior of the pipe section.

9. A valve assembly according to claim 8 wherein the first valve is selectively movable to a first valve shut off position in which the exterior surface of the valve body overlies a portion of the interior surface of the wall and entirely overlies the at least one aperture to block the flow of liquid through the at least one aperture, wherein the plug is selectively movable to a second valve shut off position in which the plug is inserted into the first end portion of the conduit section so as to block the flow of liquid through the bypass passageway and through the second portion of the liquid flow passageway at least during a portion of the time that the first valve is in the first valve third position, whereby the flow of liquid is blocked through both through the liquid flow passageway and through the at least one aperture.

10. A valve assembly according to claim 5 wherein the first valve comprises a seamless valve cylinder of a polymer material with an exterior surface that is sized to slide along the interior of the pipe section.

11. A valve assembly according to claim 1 comprising a valve actuator coupled to the first valve and operable to move the first valve between the first valve closed position and first valve open position, the valve actuator comprising first and second hydraulic pistons coupled to the first valve, a first hydraulic liquid chamber associated with the first piston and a second hydraulic liquid chamber associated with the second piston, one of the first and second pistons being movable in a direction to urge the first valve toward said first valve closed position upon delivery of hydraulic liquid to the hydraulic liquid chamber associated with said one of the first and second pistons, the other of the first and second pistons being movable in a direction to urge the first valve toward the first valve open position upon delivery of hydraulic liquid to the hydraulic liquid chamber associated with the said other of the first and second pistons, and wherein the second valve is coupled to the first valve such that the valve actuator moves the second valve to the second valve open position with the movement of the first valve to the first valve closed position and such that the valve actuator moves the second valve to the second valve closed position with the movement of the first valve to the first valve open position.

12. A valve assembly according to claim 5 wherein the second valve comprises a plug and further comprising at least one second valve support coupled to the second valve and to the first valve to thereby couple the first and second valves together.

13. A valve assembly according to claim 1 comprising:
a valve support connecting the second valve to the first valve such that the second valve moves with the movement of the first valve;
wherein the first valve comprises an annular valve body with a valve exterior surface and a valve interior surface, the valve body allowing liquid to flow through the interior of the valve body, the first valve being movable between the first valve closed position in which the exterior surface of the valve body overlies a portion of the interior surface of the wall and entirely overlies the at least one aperture and the first valve open position wherein the exterior surface of the valve body no longer entirely overlies the at least one aperture, and wherein the first valve comprises a material with flexibility such that when the first valve is in the first valve closed position and a head of water pressure is within the pipe section, the head of water can force the valve body outwardly against the overlaid at least one aperture;
wherein the second valve comprises a plug;
a conduit section coupled to the first pipe section and comprising a first conduit end portion and a second conduit end portion with at least a portion of the second portion of the liquid flow passageway communicating between the first and second conduit end portions, the conduit section also comprising a conduit wall with an interior surface and an exterior surface, the bypass passageway comprising at least one bypass liquid flow opening communicating from a location exteriorly of the conduit section to the interior of the conduit section, the plug being selectively movable to the second valve open position wherein the plug does not entirely block the at least one bypass liquid flow opening so that liquid can flow through the at least one liquid bypass opening, the plug being moved to the second valve open position with the movement of the first valve to the first valve closed position, the plug being movable to the second valve closed position wherein the plug blocks liquid flow through the second portion of the liquid flow passageway and through the at least one bypass opening with the movement of the first valve to the first valve open position, such that liquid can flow through the at least one aperture between the interior and exterior of the pipe section while the flow of liquid is blocked through the second portion of the fluid flow passageway;
wherein the first valve is selectively movable to a first valve shut off position in which the exterior surface of the valve body overlies a portion of the interior surface of the wall and entirely overlies the at least one aperture to block the flow of liquid through the at least one aperture, wherein the plug selectively movable to a second valve shut off position with the movement of the first valve to the first valve shut off position, the plug in the shut off position being inserted into the first end portion of the conduit section to a position that blocks the flow of liquid through both the bypass opening and the second portion of the liquid flow passageway, whereby when the first valve and plug are in their respective shut off positions the flow of liquid through both the at least one aperture and the liquid flow passageway is blocked; and
the valve actuator also being operable to move the first valve and plug to their respective shut off positions, the valve actuator comprising first and second hydraulic pistons coupled to the first valve, a first hydraulic liquid chamber associated with the first piston and a second hydraulic liquid chamber associated with the second piston, one of the first and second pistons being movable in a direction to urge the first valve to said first valve closed position and to said first valve shut off position upon delivery of hydraulic liquid to the hydraulic liquid chamber associated with said one of the first and second pistons, the other of the first and second pistons being movable in a direction to urge the first valve toward the first valve open position upon delivery of hydraulic liquid to the hydraulic liquid chamber associated with the said other of the first and second pistons, wherein the valve actuator moves the plug to the second valve open position with the movement of the first valve to the first valve closed position, wherein the valve actuator moves the plug to the second valve closed position with the movement of the first valve to the first valve open position, and wherein the valve actuator moves the second valve to the second valve shut off position with the movement of the first valve to the first valve shut off position.

14. A valve assembly according to claim 13 wherein the first valve comprises a hollow right cylindrical valve having an interior wall with an inner wall diameter and first and second end portions, a first ring adjacent to the first end portion and a second ring adjacent to the second end portion, the first ring having an inner ring diameter that is less than the inner wall diameter, the first ring being positioned adjacent to the first end portion such that an interior periphery portion of the first ring extends inwardly of the interior wall, a support mounted to the interior periphery portion of the first ring and extending away from the first ring, through the interior of the first valve and terminating in a distal end support portion, the plug being mounted to the distal end of the support.

15. A valve assembly according to claim 14 further comprising a plurality of push rods coupled to the first ring and extending from the first ring toward the first piston, the push rods also being coupled to the second ring and extending from the second ring toward the second piston.

16. A valve assembly according to claim 1 wherein the first valve support portion comprises plural mounting brackets that each have a respective first end mounted to the first ring and a second distal end, the brackets converging toward the center portion of the cylindrical valve with the valve supporting stem portion being mounted to the second end of each of the brackets.

17. A valve assembly according to claim 1 installed in a well bore hole accessing first and second aquifers, well pipe being connected to the valve assembly both above and below the valve assembly, bore packing positioned in the bore hole so as to substantially isolate the flow of liquid in the bore hole outside of the well pipe and valve assembly between the first and second aquifers, the valve assembly comprising: the at least one aperture communicating through the pipe section and bore hole to one of the first and second aquifers with the first valve in the first valve open position, the bypass passageway communicating through the second portion of the liquid passageway and through the bore hole to another of the first and second aquifers other than said one of the first and second aquifers with the second valve positioned in the second valve open position, whereby liquid can be directed to or from either of the first and second aquifers.

18. A valve assembly for use in recharging and pumping liquid to accomplish aquifer liquid flow control, the valve assembly comprising:
a pipe section comprised of a pipe body having a first end and a second end and defining a liquid passageway between the first end and the second end through which liquid flows to recharge pump liquid from an aquifer when the liquid passageway between the first and second ends are not blocked;
plural apertures spaced from the first and second ends and communicating from the liquid passageway to an exterior of the pipe section and to an aquifer at the exterior of the pipe section for use in recharging the aquifer or pumping liquid from the aquifer;
a valve movable between at least first and second positions, the valve being configured to block said plural apertures when the valve is in a first position without blocking liquid communication through the liquid passageway between the first and second ends, the valve also being configured to block liquid communication between the first and second ends while at least partially opening said at least one aperture when the valve is in the second position;
wherein the valve comprises a flexible first valve portion comprising a wall having a hollow central portion with a center, the first valve being movable to a first valve portion closed position overlaying and closing the plural apertures when the valve is in the first position, the valve further comprising a second plug portion movable with the first valve portion to a plug open position allowing liquid communication between the first and second ends of the pipe section when the first valve portion is in the first valve closed position, a valve support coupled to the wall of the first valve portion and to the second plug portion for coupling the second plug portion to the first valve portion such that the second plug portion is movable with the first valve portion, the valve support comprising a stem portion carrying the second plug portion and a first support portion mounted to the wall and supporting the stem portion, the first support portion comprising plural stem supporting bracket portions with openings there between such that liquid can flow through the first support portion, the first valve portion being movable to a first valve portion open position wherein the wall of the first valve portion at least partially opens the at least one first aperture, the second plug portion being movable with the first valve portion to a plug closed position to block liquid communication between the first and second ends when the first valve portion is in the first valve open position, wherein when the valve assembly is placed in a well liquid flow to or from at least one aquifer is controlled through the plural apertures and through the liquid flow passageway between the first and second ends of the pipe section to selectively allow recharge of liquid to or pumping liquid from the aquifer through the plural apertures or the liquid flow passageway.

19. A valve assembly according to claim 18 wherein the valve is movable to a third shut off position, the valve being configured to block liquid communication between the first and second ends of the pipe section and through the plural apertures when the valve is in the third shut off position.

20. A valve assembly for use in aquifer liquid flow control comprising:
a hollow housing comprising a body with a housing wall and defining a liquid flow passageway through the housing, at least one aperture being provided through the housing wall between an interior and exterior of the housing and communicating between a first portion of the liquid flow passageway and the exterior of the housing;
a projection within the housing that defines a second portion of the liquid flow passageway that communicates with the first portion of the liquid flow passageway such that liquid can flow through the first and second portions of the liquid flow passageway and through the housing;
at least one pathway communicating through the second portion and between the first and second liquid flow passageway portions; and
a valve comprising an annular first valve member positioned within the first portion of the liquid flow passageway and slidable along the housing wall between a first valve member closed position in which the first valve member overlies and blocks the at least one aperture and a first valve member open position in which the first valve member no longer blocks the at least one aperture, the valve further comprising a second valve member coupled to and slidable with the sliding movement of the first valve member, the second valve member being slidable to a second valve member open position with the sliding of the first valve member to the first valve member closed position and slidable to a second valve member closed position with the movement of the first valve member to the first valve member open position, a hydraulic actuator coupled to the valve and operable to cause the sliding of the first valve member and sliding of the second valve member wherein when the second valve member is in the second valve member open position the second valve member does not block the flow of liquid through the second portion of the first flow passageway such that liquid can flow through the first portion of the liquid flow passageway, the first valve member and through the second flow passageway while the at least one aperture is blocked by the first valve member, and wherein when the second valve member is in the second valve member closed position the flow of liquid through the second portion of the liquid passageway is blocked by the second valve member and the at least one aperture no longer blocked by the first valve member, whereby when the valve assembly is installed in a well with the first valve member in the first valve member closed position, liquid can flow through the housing to an aquifer without flowing through the at least one aperture, and with the first valve member in the first valve member open position, liquid can flow through the at least one aperture to an aquifer without flowing through the second portion of the liquid flow passageway and through the housing;

wherein the first valve member comprises a hollow cylindrical valve having an interior wall with an inner wall diameter and first and second end portions, the cylindrical valve having a valve center portion spaced inwardly from the interior wall through which liquid can flow, a first ring adjacent to the first end portion and a second ring adjacent to the second end portion, the first ring having an inner ring diameter that is less than the inner wall diameter, the first ring being positioned adjacent to the first end portion such that an interior periphery portion of the first ring extends inwardly of the interior wall, a support comprising a first support portion mounted to the interior periphery portion of the first ring and extending away from the first ring and toward the center portion of the cylindrical valve, the first support portion extending through the interior of the first valve and terminating in a second distal end support portion, the second distal end support portion comprising a valve supporting stem portion extending away from the first ring and first support portion and beyond the second end portion of the cylindrical valve, the valve support being configured to allow liquid to flow through the cylindrical valve and first portion of the valve support within the interior of the cylindrical valve, and the second valve member being mounted to the distal end of the support.

\* \* \* \* \*